(12) United States Patent
Hukatsu et al.

(10) Patent No.: US 11,135,753 B2
(45) Date of Patent: Oct. 5, 2021

(54) INJECTION MOLD, RESIN MEMBER, AND METHOD FOR PRODUCING RESIN PRODUCT

(71) Applicant: BRIDGESTONE CORPORATION, Chuo-ku Tokyo (JP)

(72) Inventors: Shunsuke Hukatsu, Yokohama (JP); Kanji Tanaka, Kodaira (JP); Yoichi Nishimuro, Kunitachi (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 16/618,224

(22) PCT Filed: May 14, 2018

(86) PCT No.: PCT/JP2018/018567
§ 371 (c)(1),
(2) Date: Nov. 29, 2019

(87) PCT Pub. No.: WO2018/221184
PCT Pub. Date: Dec. 6, 2018

(65) Prior Publication Data
US 2020/0114559 A1    Apr. 16, 2020

(30) Foreign Application Priority Data
Jun. 2, 2017    (JP) .............................. JP2017-110451

(51) Int. Cl.
*F16B 2/00*    (2006.01)
*B29C 45/37*    (2006.01)
(Continued)

(52) U.S. Cl.
CPC .......... *B29C 45/37* (2013.01); *B29C 45/0025* (2013.01); *B29C 45/73* (2013.01);
(Continued)

(58) Field of Classification Search
None
See application file for complete search history.

(56) References Cited

U.S. PATENT DOCUMENTS 1,519,095 A * 12/1924 Phillips ............... F16L 37/1215
                                                            285/34
3,236,543 A *  2/1966 Mueller ................ F16L 33/006
                                                            285/2
(Continued)

FOREIGN PATENT DOCUMENTS

CN    1432461 A    7/2003
CN    1689784 A    11/2005
(Continued)

OTHER PUBLICATIONS

Feb. 18, 2019, search result of Office Action issued by the Taiwan Intellectual Property Office in the corresponding Taiwanese Patent Application No. 107118637.
(Continued)

*Primary Examiner* — Basil S Katcheves
(74) *Attorney, Agent, or Firm* — Kenja IP Law PC

(57) ABSTRACT

An injection mold including a gate and a cavity, where a weld portion is formed inside the cavity by injecting molten resin containing reinforcing fibers from the gate into the cavity, the injection mold has a resin reservoir open to the cavity, and in a first cross section along an opening end surface 110S of the resin reservoir 110 to the cavity, a distance CLD between a width center line CL11 of the resin reservoir and a width center line of the cavity, which is measured along a perpendicular line n12 of the width center line CL12 of the cavity, changes at least in part along the width center line of the cavity.

6 Claims, 22 Drawing Sheets

(51) Int. Cl.
   *B29C 45/00* (2006.01)
   *B29C 45/73* (2006.01)
   *B29C 70/14* (2006.01)
   *F16B 2/06* (2006.01)
   *F16B 7/00* (2006.01)
   *B29K 105/14* (2006.01)
   *B29K 105/20* (2006.01)

(52) U.S. Cl.
   CPC .............. *B29C 70/14* (2013.01); *F16B 2/065* (2013.01); *F16B 7/00* (2013.01); *B29C 2045/0027* (2013.01); *B29K 2105/14* (2013.01); *B29K 2105/20* (2013.01)

(56) References Cited

U.S. PATENT DOCUMENTS

| | | | | |
|---|---|---|---|---|
| 4,014,568 | A * | 3/1977 | Carter | F16L 47/04 285/39 |
| 4,848,802 | A * | 7/1989 | Wolf | F16L 19/086 285/39 |
| 5,355,908 | A * | 10/1994 | Berger | F16L 15/001 137/614.04 |
| D377,969 | S * | 2/1997 | Grantham | D23/262 |
| 6,834,891 | B2 * | 12/2004 | Matsubara | F16L 37/144 285/319 |
| D508,980 | S * | 8/2005 | Bigelow | D23/262 |
| 6,941,832 | B2 | 9/2005 | Koji et al. | |
| 7,168,922 | B2 | 1/2007 | Stagg et al. | |
| 7,490,865 | B1 * | 2/2009 | Tsai | F16L 37/0925 285/322 |
| 7,789,628 | B2 | 9/2010 | Stagg et al. | |
| 8,287,005 | B2 * | 10/2012 | Leslie | F16L 15/08 285/9.1 |
| 8,801,045 | B2 * | 8/2014 | Muto | F16L 37/0915 285/39 |
| 2004/0241276 | A1 * | 12/2004 | Miyasaka | B29D 15/00 425/543 |
| 2010/0148496 | A1 * | 6/2010 | Smahl | F16B 7/182 285/39 |
| 2010/0327491 | A1 | 12/2010 | Hiroaki | |
| 2011/0150602 | A1 * | 6/2011 | Sieper | B29C 45/0046 411/378 |
| 2011/0188922 | A1 * | 8/2011 | Thacker | F16B 7/00 403/26 |
| 2016/0116088 | A1 * | 4/2016 | Graham | F16L 19/0206 285/390 |
| 2016/0186900 | A1 * | 6/2016 | Ho | B65D 35/38 285/390 |
| 2016/0376850 | A1 * | 12/2016 | Finke | E21B 17/042 285/390 |
| 2017/0173829 | A1 | 6/2017 | Kenjiro | |
| 2020/0114558 | A1 * | 4/2020 | Katsu | F16L 15/00 |

FOREIGN PATENT DOCUMENTS

| | | |
|---|---|---|
| CN | 101548081 A | 9/2009 |
| CN | 101934571 A | 1/2011 |
| JP | H06134819 A | 5/1994 |
| JP | H07205747 A | 8/1995 |
| JP | 2002240096 A | 8/2002 |
| JP | 2011005743 A | 1/2011 |
| JP | 2012106391 A | 6/2012 |
| JP | 2016098964 A | 5/2016 |
| WO | 2016009721 A1 | 1/2016 |

OTHER PUBLICATIONS

Jun. 12, 2018, International Search Report issued in the International Patent Application No. PCT/JP2018/018567.

Dec. 3, 2019, International Preliminary Report on Patentability issued in the International Patent Application No. PCT/JP2018/018567.

Jan. 28, 2021, search result of the Extended European Search Report issued by the European Patent Office in the corresponding European Patent Application No. 18808929.6.

Apr. 2, 2021, search result of Office Action issued by the China National Intellectual Property Administration in the corresponding Chinese Patent Application No. 201880036661.6.

* cited by examiner

C-C

E–E

F-F

G-G

F'-F'

G'-G'

H'-H'

INJECTION MOLD, RESIN MEMBER, AND METHOD FOR PRODUCING RESIN PRODUCT

TECHNICAL FIELD

This disclosure relates to an injection mold, a resin member, and a method for producing a resin product.

The present application claims priority based on JP 2017-110451 filed in Japan on Jun. 2, 2017, the entire contents of which are incorporated herein by reference.

BACKGROUND

When molten resins join together in the cavity of an injection mold to form a weld portion, the strength of the weld portion tends to be lower than the strength of other portions in a molded article. Various attempts have been made to improve the strength of the weld portion (for example, JP 2002-240096 A (PTL 1)).

CITATION LIST

Patent Literature

PTL 1: JP 2002-240096 A

SUMMARY

Technical Problem

However, the conventional techniques cannot sufficiently improve the strength of a weld portion, and there is room for improvement.

It could thus be helpful to provide an injection mold, a resin member, and a method for producing a resin product, with which the strength of a weld portion can be improved.

Solution to Problem

The presently disclosed injection mold includes a gate and a cavity, where the injection mold is configured such that a weld portion is formed inside the cavity by injecting molten resin containing reinforcing fibers from the gate into the cavity, the injection mold has a resin reservoir open to the cavity, and in a first cross section along an opening end surface of the resin reservoir to the cavity, a distance between a width center line of the resin reservoir and a width center line of the cavity, which is measured along a perpendicular line of the width center line of the cavity, changes at least in part along the width center line of the cavity.

The presently disclosed resin member includes a resin containing reinforcing fibers, and has a weld portion, where the resin member has a projection connected to a main body of the resin member, in a first cross section along a connecting end surface of the projection to the main body, a distance between a width center line of the projection and a width center line of the main body, which is measured along a perpendicular line of the width center line of the main body, changes at least in part along the width center line of the main body.

The presently disclosed method for producing a resin product includes a molding step in which molten resin containing reinforcing fibers is injected from the gate into the cavity of the above-described injection mold to mold a resin member, where in the molding step, the cavity molds a main body of the resin member, and the resin reservoir molds a projection connected to the main body.

Advantageous Effect

The present disclosure can provide an injection mold, a resin member, and a method for producing a resin product, with which the strength of a weld portion can be improved.

DETAILED DESCRIPTION

The presently disclosed injection mold, resin member, and method for producing a resin product can be used in resin products of all types, applications, and shapes.

The following describes embodiments of the presently disclosed injection mold, resin member, and method for producing a resin product as examples with reference to the drawings.

Embodiment 1

Embodiment 1 of the present disclosure will be described with reference to FIGS. 1 to 8B.

Figure 4:
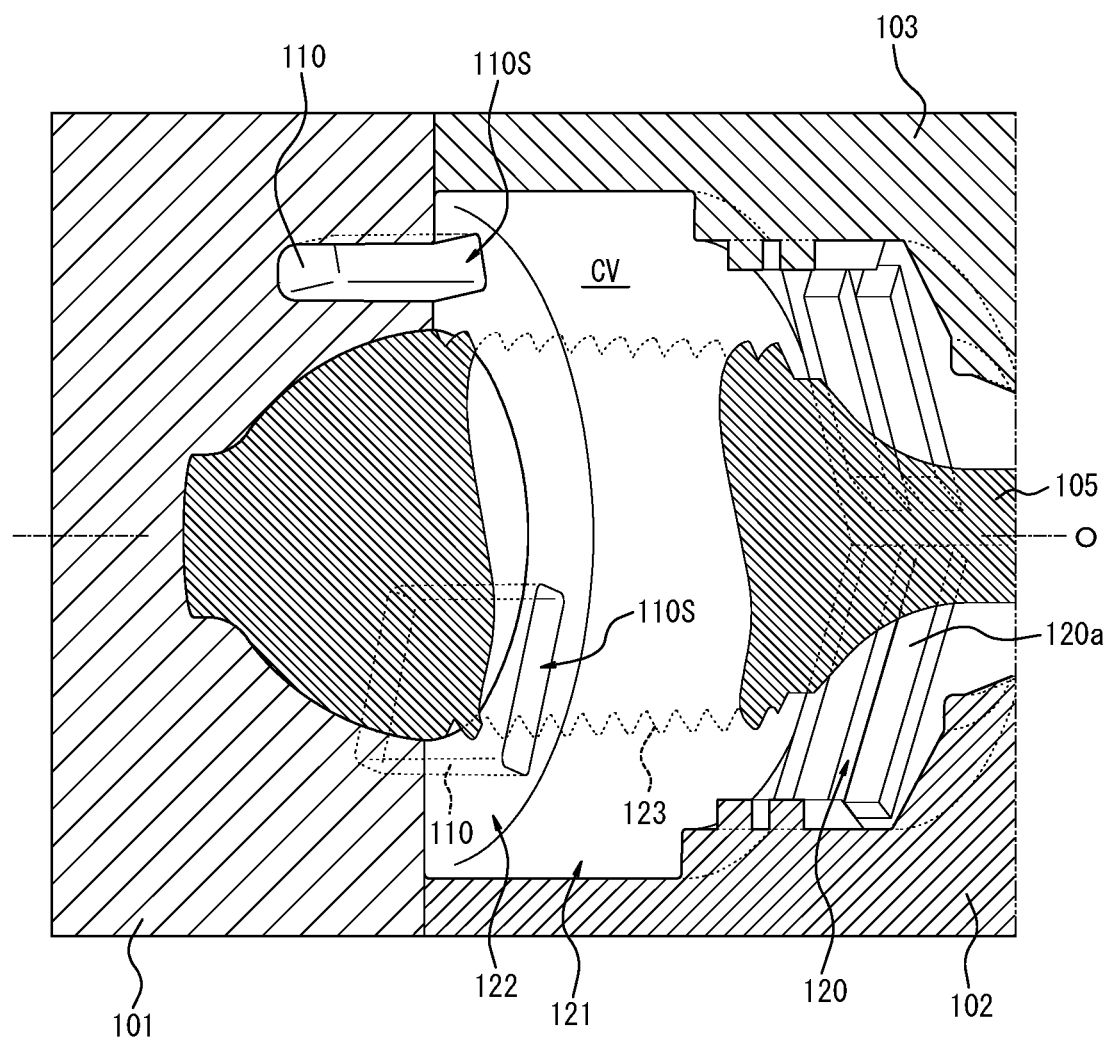
FIG. 4 is a partial cross-sectional perspective view, which illustrates a main part of the injection mold of FIG. 2A in a partial cross-sectional view in the axial direction and in a perspective view.
Figure 5:
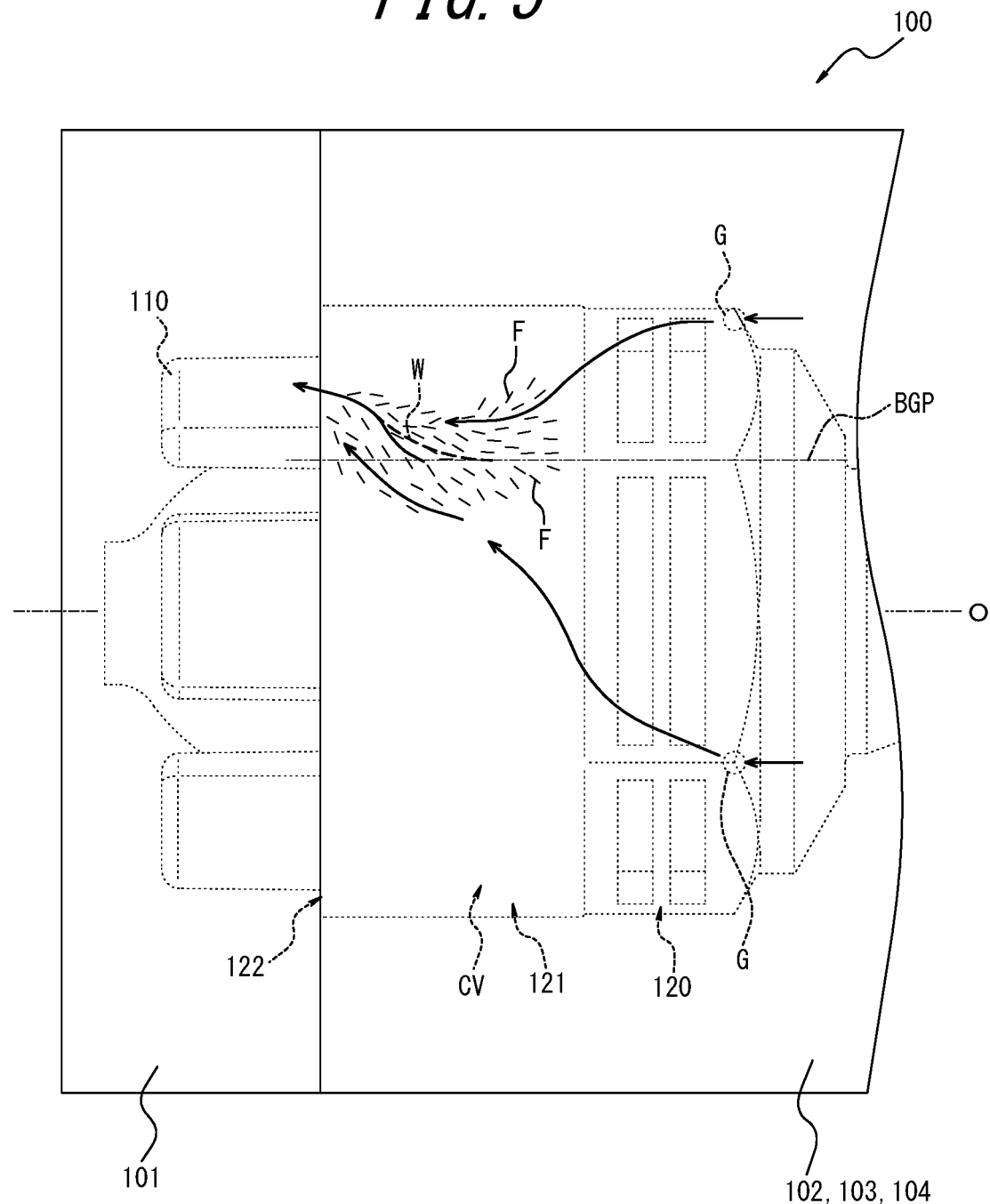
FIG. 5 is an enlarged side view illustrating a main part of the injection mold of FIG. 1, and is a view explaining the working of Embodiment 1 of the present disclosure.
Figure 6A:
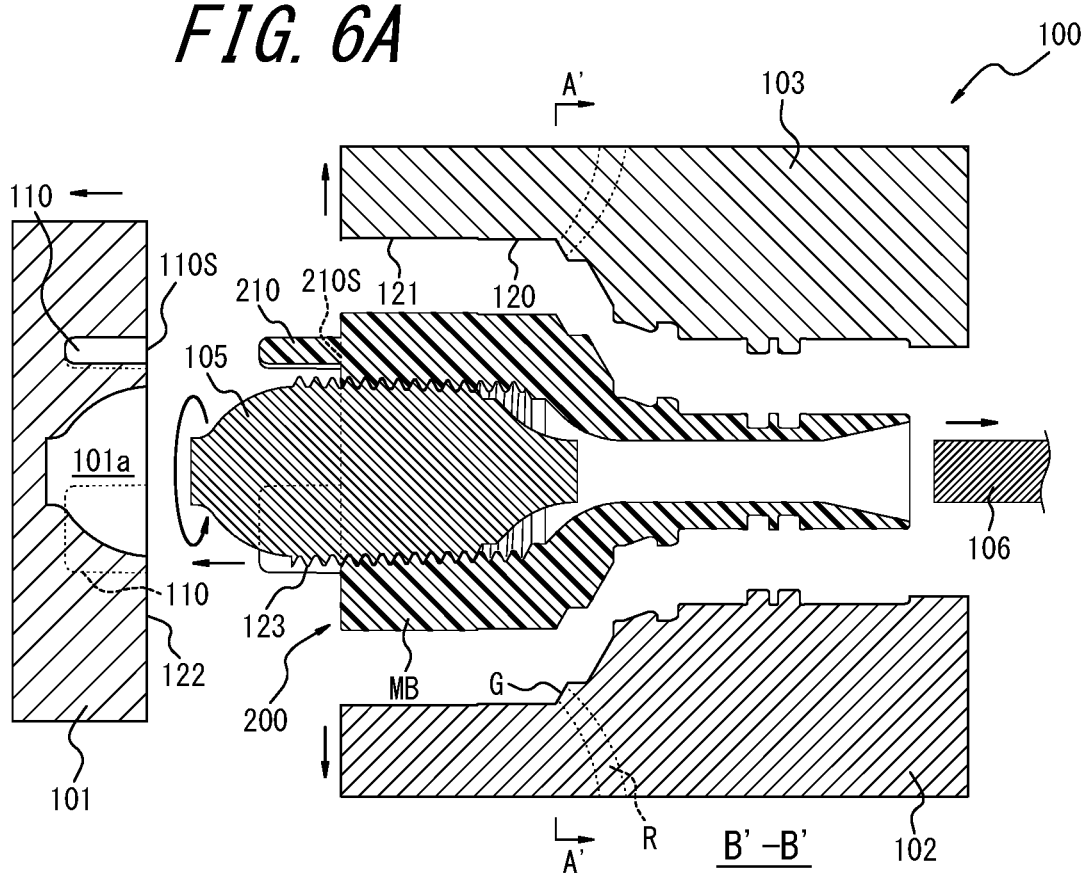
FIG. 6A is a cross-sectional view in the axial direction along the line B'-B' of FIG. 6B that illustrates the mold release state of the injection mold of FIG. 1.
Figure 6B:
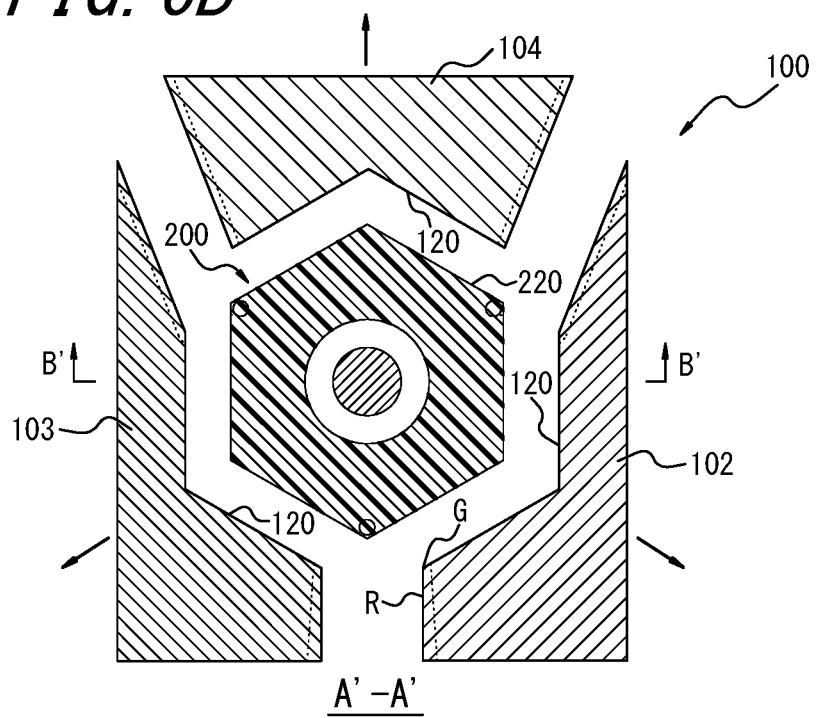
FIG. 6B is a cross-sectional view in the perpendicular-to-axis direction along the line A'-A' of FIG. 6A that illustrates the mold release state of the injection mold of FIG. 1.
Figure 7A:
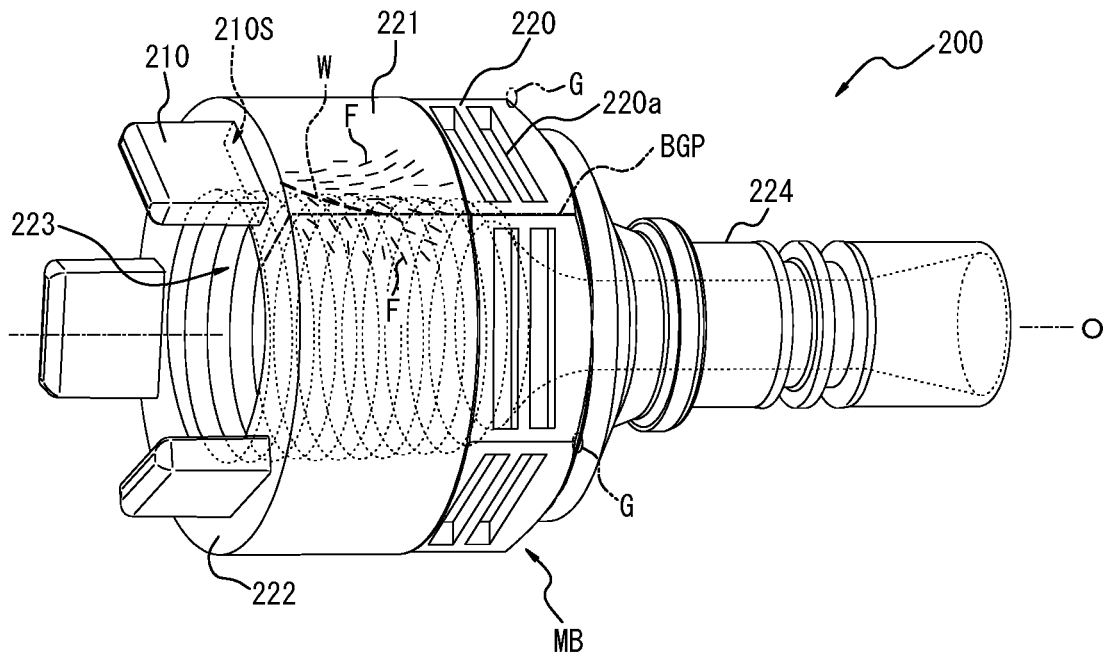
FIG. 7A is a perspective view illustrating the resin member of Embodiment 1 of the present disclosure.
Figure 7B:
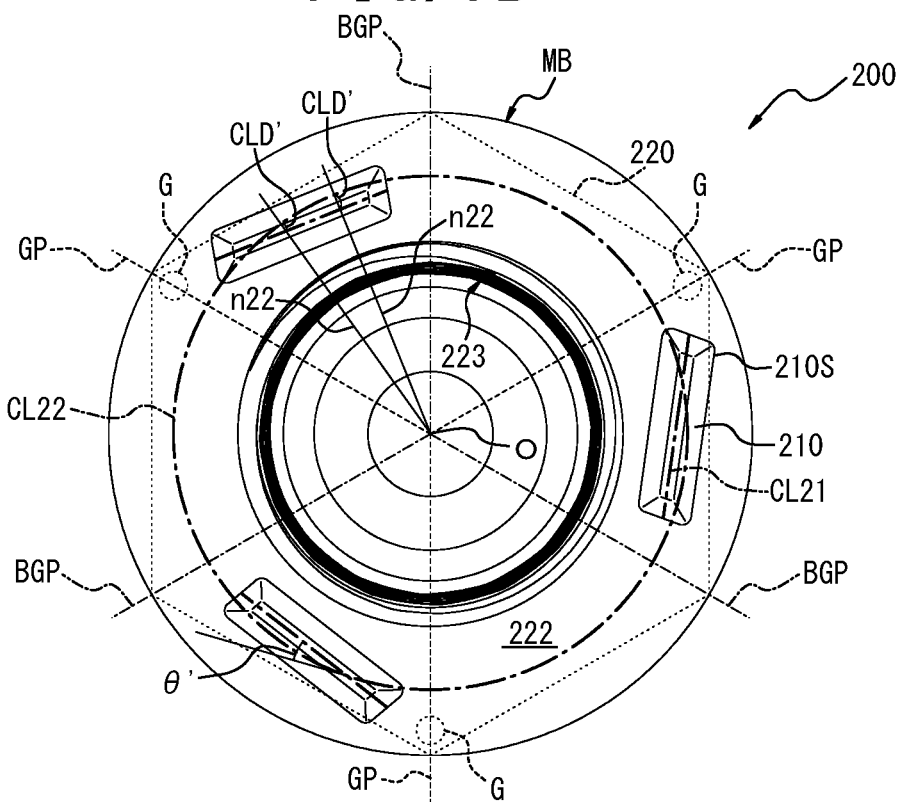
FIG. 7B is a front view illustrating the resin member of FIG. 7A when observing from one side in the axial direction.
Figure 8A:
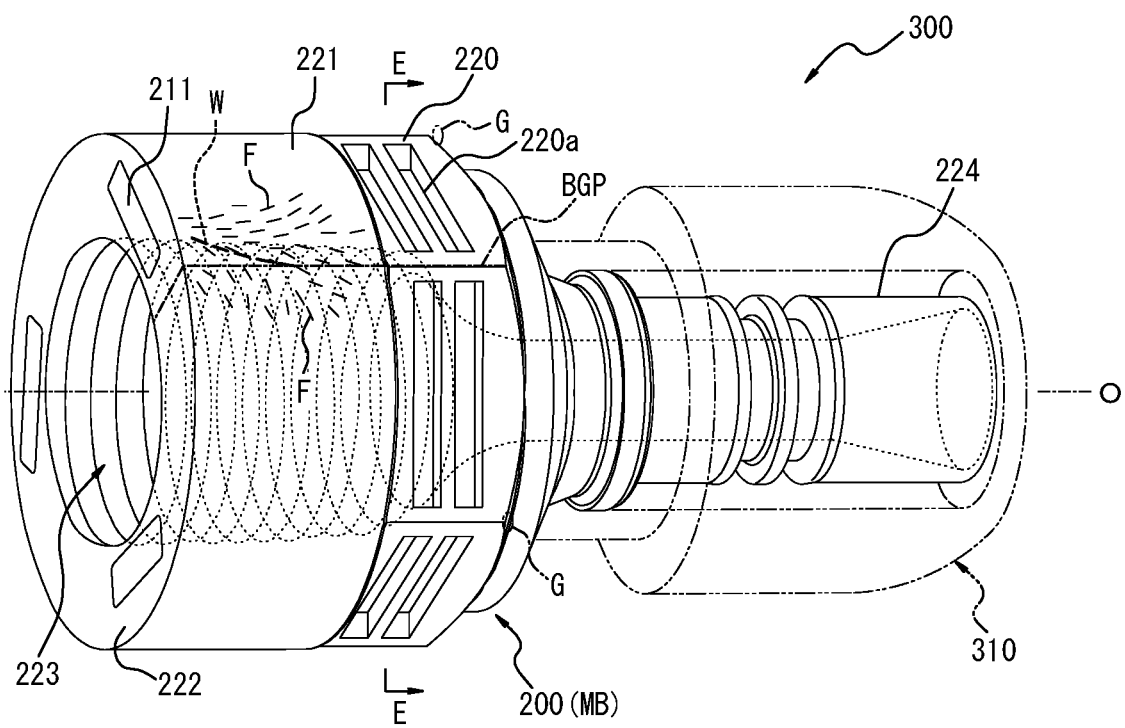
FIG. 8A is a perspective view illustrating a joint obtained with the resin member of FIGS. 7A and 7B.
Figure 8B:
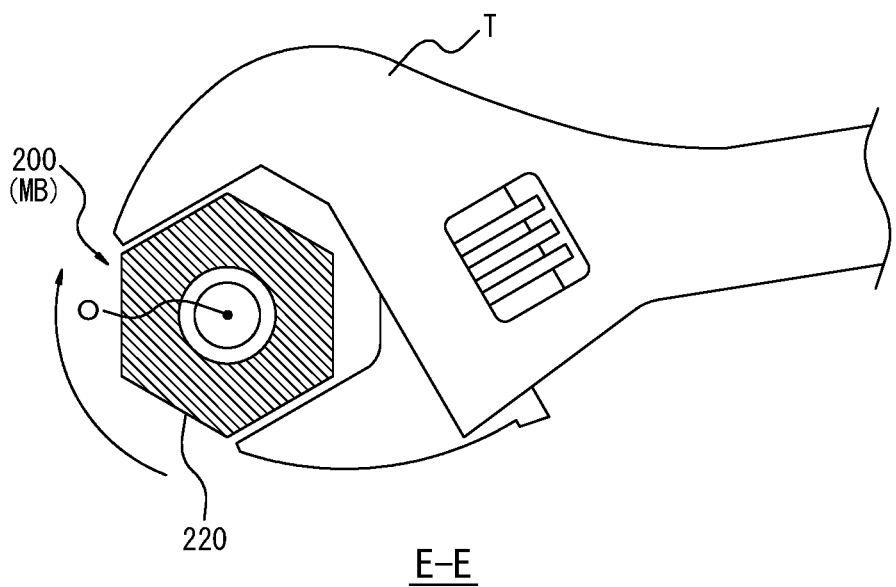
FIG. 8B is a cross-sectional view in the perpendicular-to-axis direction along the line E-E of FIG. 8A that illustrates the joint of FIG. 8A, and is a view explaining a state in use.

FIGS. 1 to 5 illustrate an injection mold 100 of the present embodiment in a closed state, and FIGS. 6A and 6B illustrate opening the injection mold 100 and taking out a resin member 200 as a molded article. FIGS. 7A and 7B illustrate the resin member 200 of the present embodiment, which is obtained by injection molding with the injection mold 100 of FIGS. 1 to 6B. The resin member 200 may be used in resin products of any type and application, and is suitably used in a joint. FIGS. 8A and 8B illustrate a joint 300, which is an example of a final resin product obtained with the resin member 200 of FIGS. 7A and 7B.

Figure 1:
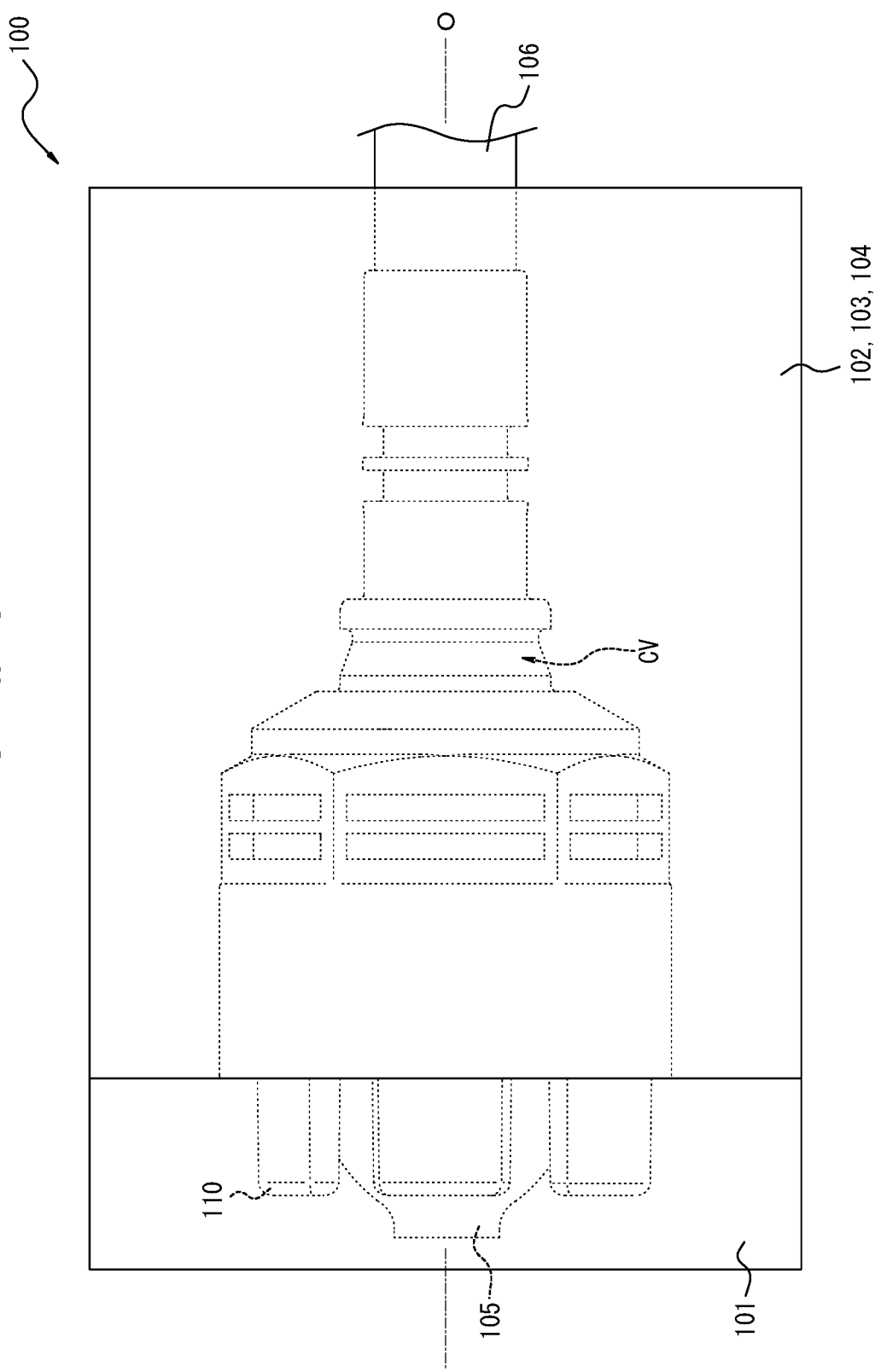
FIG. 1 is a side view of the injection mold of Embodiment 1 of the present disclosure.
Figure 2A:
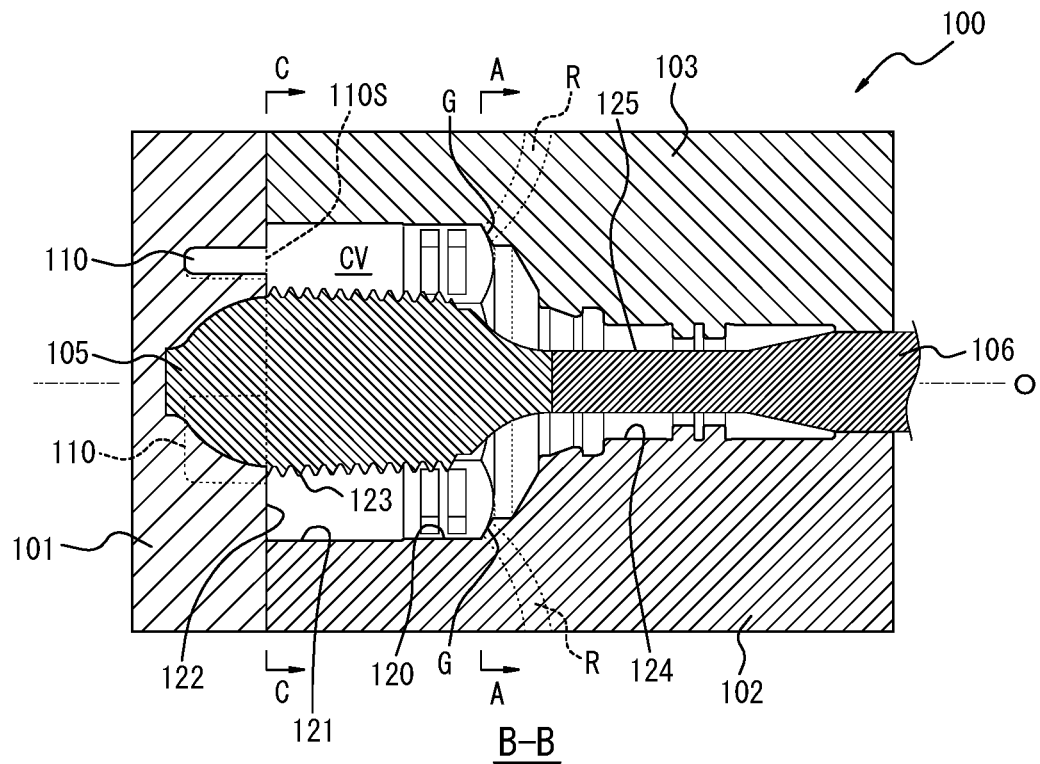
FIG. 2A is a cross-sectional view in the axial direction along the line B-B of FIG. 2B that illustrates the injection mold of FIG. 1.
Figure 2B:
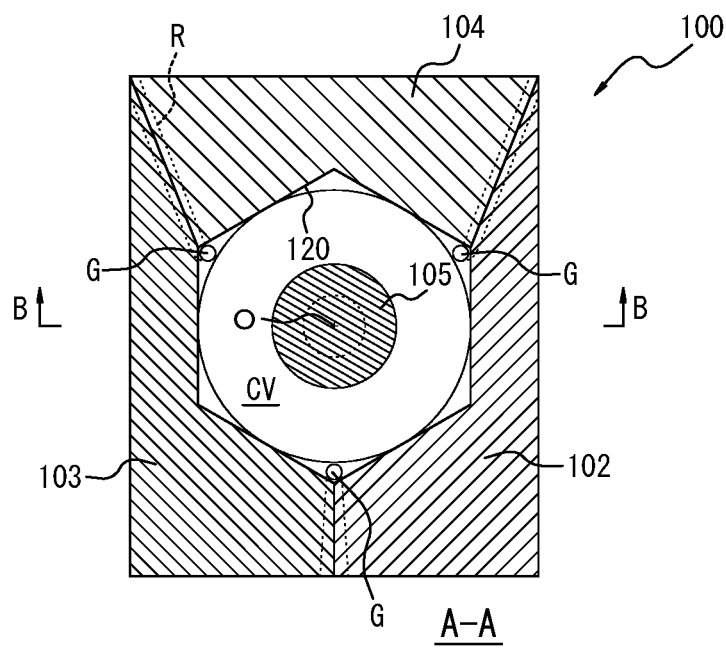
FIG. 2B is a cross-sectional view in the perpendicular-to-axis direction along the line A-A of FIG. 2A that illustrates the injection mold of FIG. 1.

As illustrated in FIGS. 1 to 2B, the injection mold (hereinafter also simply referred to as mold) 100 of the present embodiment has a cavity CV defined by a cavity surface, at least one (three in the present example) gate G which is an injection port for injecting molten resin containing reinforcing fibers conveyed by a runner R into the cavity CV, and at least one (three in the present example) resin reservoir 110 which is a concave portion open to the cavity CV.

The mold 100 is configured such that resins join together inside the cavity CV to form a weld portion W that is hardened in a state where the resin interfaces are in contact with each other, which will be described in detail later. The resin reservoir 110 is provided to improve the strength of the weld portion W.

The resin member 200 of the present embodiment is produced with the following method.

First, as illustrated in FIGS. 1 to 5, the mold 100 is closed and a cavity CV is formed inside. At this state, molten resin containing reinforcing fibers flows from the runner R toward the gate G and is injected from the gate G into the cavity CV. After the cavity CV is filled with the molten resin, the resin inside the cavity CV is cooled and cured to a predetermined degree. Next, as illustrated in FIGS. 6A and 6B, the mold 100 is opened to take out a resin member 200. As described above, the molding step of a resin member 200 is completed, and a resin member 200 made of a resin containing reinforcing fibers as illustrated in FIGS. 7A and 7B is obtained. The resin member 200 has a main body MB and at least one (three in the present example) projection 210 connected to the main body MB. In the molding step, the main body MB is molded by the cavity CV, and the projection 210 is molded by the resin reservoir 110.

The resin member 200 obtained by the molding step may be used as a final resin product as it is. Alternatively, the resin member 200 may, after the molding step, be further processed or assembled with another member to obtain a final resin product. For example, after the molding step, the projection 210 of the resin member 200 may be removed by cutting or other means (removal step).

The joint 300 of FIGS. 8A and 8B is obtained by removing the projection 210 from the resin member 200 (FIGS. 7A and 7B) obtained by the molding step and attaching an outer cylinder 310 to the main body MB (assembly step). The joint 300 is suitably used in pipes for supplying water and hot water, and can also be used in pipes for fluids other than water (for example, liquids such as oil and liquid medicines, and gases such as air and gas). As in the example of FIGS. 8A and 8B, when the projection 210 is removed from the resin member 200, a trace 211 of the removed projection 210 may remain in the main body MB.

The following describes the structure of the resin member 200 of the present embodiment in more detail with reference to FIGS. 7A to 8B.

As illustrated in FIGS. 7A, 7B and 8A, the main body MB of the resin member 200 is a cylindrical member extending straight. The main body MB has an one-axial-side portion 221 located on one side in the axial direction of the main body MB, an axial-middle portion 220 located in the middle in the axial direction of the main body MB, and an other-axial-side portion 224 located on the other side in the axial direction of the main body MB.

In the present specification, the "cylindrical member" is not limited to a member in a shape where both the outer circumferential surface and the inner circumferential surface have a circular cross section along the entire length. The "cylindrical member" also includes a member in a shape that is substantially cylindrical when viewed as a whole, and the outer circumferential surface and/or the inner circumferential surface may have a non-circular cross section at least in part of the extending direction.

The resin member 200 has a female screw 223 on the inner circumferential surface of the region extending from the one-axial-side portion 221 to the axial-middle portion 220. The female screw 223 is configured to be connected to a male screw of another member (for example, a metal water pipe) not illustrated in the figure. The female screw 223 is a tapered female screw that gradually decreases in diameter from the one axial side toward the other axial side (back side) of the main body MB.

As illustrated in FIGS. 7A and 7B, for the resin member 200 after the molding step and before the removal step, the projection 210 is connected to an end surface 222 on the one axial side of the main body MB.

In the present specification, the "axial direction" of the resin member 200 or the main body MB refers to a direction parallel to the central axis O of the cylindrical shape formed by the main body MB. In the present example, the central axis O extends in a straight line. In addition, the "one axial side" of the resin member 200 or the main body MB refers to the side on which the female screw 223 is formed of the two sides in the axial direction, and the "other axial side" of the resin member 200 or the main body MB refers to the opposite side. Further, the "perpendicular-to-axis direction" of the resin member 200 or the main body MB refers to a direction perpendicular to the axial direction.

The resin member 200 of the present embodiment is made of a resin containing reinforcing fibers.

Any resin may be used as the resin of the resin member 200. For example, when the resin member 200 is used in the joint 300 as illustrated in FIGS. 8A and 8B, polyphenylene sulfide (PPS), for example, is suitably used as the resin of the resin member 200 because it has, for example, excellent heat resistance and chemical resistance.

The reinforcing fibers in the resin of the resin member 200 are contained to improve the strength of the resin. The reinforcing fibers may be any fibers as long as they improve the strength of the resin. For example, when the resin member 200 is used in the joint 300 as illustrated in FIGS. 8A and 8B, glass fibers, for example, may be used as the reinforcing fibers because they can improve the strength of the resin member 200 and the strength of the joint 300, specifically, they can improve the crack resistance and the creep deformation resistance.

The entire resin member 200 including the female screw 223 is integrally formed of resin, so that the weight and the cost of the resin member 200 and the joint 300 can be reduced as compared with the case where at least a part of the resin member 200 (for example, only the female screw 223) is made of metal. In addition, since the resin member 200 includes reinforcing fibers in the resin, it is possible to ensure the same strength as in the case where at least a part is made of metal.

The outer circumferential surfaces of the one-axial-side portion 221 and the other-axial-side portion 224 of the resin member 200 have a circular cross section in the perpendicular-to-axis direction.

The outer circumferential surface of the axial-middle portion 220 of the resin member 200 has a polygonal (hexagonal in the present example) cross section in the perpendicular-to-axis direction, thereby forming a torque input portion 220. The outer circumferential surface of the torque input portion 220 has a polygonal cross section in the perpendicular-to-axis direction. Therefore, when the female screw 223 is tightened against a male screw of another member during construction of the joint 300, for example, a tool T such as a wrench as illustrated in FIG. 8B grips a pair of opposed flat faces of the torque input portion 220 from the outside and the torque from the tool T is properly input. In the present example, a plurality of concave portions 220a are formed on the outer circumferential surface of the torque input portion 220.

In the illustrated example, the outer diameter of the one-axial-side portion 221 and the outer diameter of the torque input portion 220 (the diameter of the circumscribed circle of the polygonal cross section of the torque input portion 220) are substantially the same, and are almost constant along the axial direction. The end portion of the tapered female screw 223 is formed on the inner circumferential surface of the torque input portion 220, that is, the inner diameter thereof is slightly smaller than that of the one-axial-side portion 221. In this way, the circumferential wall thickness and the strength of the torque input portion 220 are guaranteed to withstand the torque from the above-described tool T.

The outer diameter of the other-axial-side portion 224 is much smaller than the outer diameters of the one-axial-side portion 221 and the torque input portion 220. In the joint 300 of FIG. 8A, an outer cylinder 310 having a larger diameter is attached to the other-axial-side portion 224. An annular space is defined between the other-axial-side portion 224 of the resin member 200 and the outer cylinder 310, and this annular space is configured such that a circular tubular member (for example, a pipe made of polybutene or cross-linked polyethylene) not illustrated in the figure can be inserted therein.

The projection 210 will be described in more detail later.

Next, the structure of the injection mold 100 of the present embodiment, which is configured to mold the above-described resin member 200 of the present embodiment, will be described in more detail with reference to FIGS. 1 to 6B.

The mold 100 has outer mold portions 101 to 104 and inner mold portions 105 and 106. When the mold 100 is closed as illustrated in FIGS. 1 to 5, a cavity CV is defined by the inside cavity surfaces of the outer mold portions 101 to 104 and the outside cavity surfaces of the inner mold portions 105 and 106.

As illustrated in FIGS. 2A and 2B, the cavity CV is configured in a cylindrical shape extending straight, by which the main body MB of the resin member 200, which is a cylindrical member, is molded. The outer mold portion 101, which is located closest to the one axial side among the outer mold portions 101 to 104, has a cavity surface 122 for one-axial-side end surface which is configured to mold the one-axial-side end surface 222 of the resin member 200. The other outer mold portions 102 to 104 are arranged circumferentially on the other axial side with respect to the outer mold portion 101, and each of them has a cavity surface for outer circumferential surface which is configured to mold an outer circumferential surface along the entire length of the main body MB of the resin member 200. Each of the cavity surfaces for outer circumferential surface of the outer mold portions 102 to 104 has a cavity surface 121 for one-axial-side portion which is configured to mold the outer circumferential surface of the one-axial-side portion 221 of the resin member 200, a cavity surface 120 for torque input portion which is configured to mold the outer circumferential surface of the torque input portion 220 of the resin member 200, and a cavity surface 124 for other-axial-side portion which is configured to mold the outer circumferential surface of the other-axial-side portion 224 of the resin member 200, respectively. The inner mold portion 105, which is located on the one axial side of the inner mold portions 105 and 106, has a cavity surface 123 for female screw which is configured to mold the female screw 223 of the resin member 200, and a part on the one axial side of the cavity surface 123 for female screw is configured to be accommodated in an inner mold accommodating portion 101a (FIG. 6A) provided in the outer mold portion 101. The cavity surface 123 for female screw gradually decreases in diameter as it goes from the one axial side to the other axial side (back side) of the cavity CV. The other inner mold portion 106 has a cavity surface 125 for other-axial-side portion which is configured to mold the inner circumferential surface of the other-axial-side portion 224 of the resin member 200.

The outer mold portion 101 has a resin reservoir 110, and the resin reservoir 110 is open to the cavity surface 122 for one-axial-side end surface. The resin reservoir 110 is a portion where a part of molten resin in the cavity CV flows and accumulates when the molten resin is injected into the cavity CV, and a portion where the projection 210 of the resin member 200 is molded.

In the present specification, the "axial direction" of the mold 100 or the cavity CV refers to a direction parallel to the central axis O of the cylindrical shape formed by the cavity CV. In the present example, the central axis O extends in a straight line. In addition, the "one axial side" of the mold 100 or the cavity CV refers to the side where the cavity surface 123 for female screw is arranged of the two sides in the axial direction, and the "other axial side" of the mold 100 or the cavity CV refers to the opposite side. Further, the "perpendicular-to-axis direction" of the mold 100 or the cavity CV refers to a direction perpendicular to the axial direction.

When the resin member 200 is released from the mold, the outer mold portions 102 to 104 are each removed radially outward from the resin member 200, which is a molded article, and the outer mold portion 101 is removed from the resin member 200 to the one axial side, as illustrated in FIGS. 6A and 6B. In addition, the inner mold portion 105 is rotated and pulled out from the resin member 200 to the one axial side, and the inner mold portion 106 is pulled out from the resin member 200 to the other axial side.

For the mold 100, a cavity CV similar to that of the present example may be defined by outer mold portions and inner mold portions which have different structures from the outer mold portions 101 to 104 and the inner mold portions 105 and 106 of the present example.

In the following description of the mold 100, the mold 100 is in a closed state unless otherwise specified.

The cavity surface 121 for one-axial-side portion and the cavity surface 124 for other-axial-side portion have a circular cross section in the perpendicular-to-axis direction.

As illustrated in FIG. 2B, the cavity surface 120 for torque input portion has a polygonal (hexagonal in the present example) cross section in the perpendicular-to-axis direction. In the illustrated example, a plurality of convex portions 120a (FIG. 4) configured to form a plurality of concave portions 220a in the torque input portion 220 of the resin member 200 are formed on the cavity surface 120 for torque input portion.

In the illustrated example, the outer diameter of the cavity surface 121 for one-axial-side portion and the outer diameter of the cavity surface 120 for torque input portion (the diameter of the circumscribed circle of the polygonal cross section of the cavity surface 120 for torque input portion) are substantially the same. The end portion of the cavity surface 123 for female screw is arranged on the inner circumferential side of the cavity surface 120 for torque input portion, that is, the inner diameter of the cavity CV there is slightly smaller than that of the cavity surface 121 for one-axial-side portion.

The outer diameter of the cavity surface 124 for other-axial-side portion is much smaller than the outer diameter of the cavity surface 121 for one-axial-side portion and the outer diameter of the cavity surface 120 for torque input portion.

As illustrated in FIGS. 2A and 2B, a gate G, which is directed to the one axial side and opens to the cavity CV, is provided on the other axial side of the cavity surface 120 for torque input portion. More specifically, in the present example, the gate G is provided in the vicinity of the other-axial-side end portion of the cavity surface 120 for torque input portion. In the illustrated example, three gates G are provided at equal intervals in the circumferential direction (at angular positions distanced by 120°). In the present specification, the "angular position" in the mold 100 or the resin member 200 refers to an angular position around the central axis O and corresponds to a circumferential position.

Figure 3A:
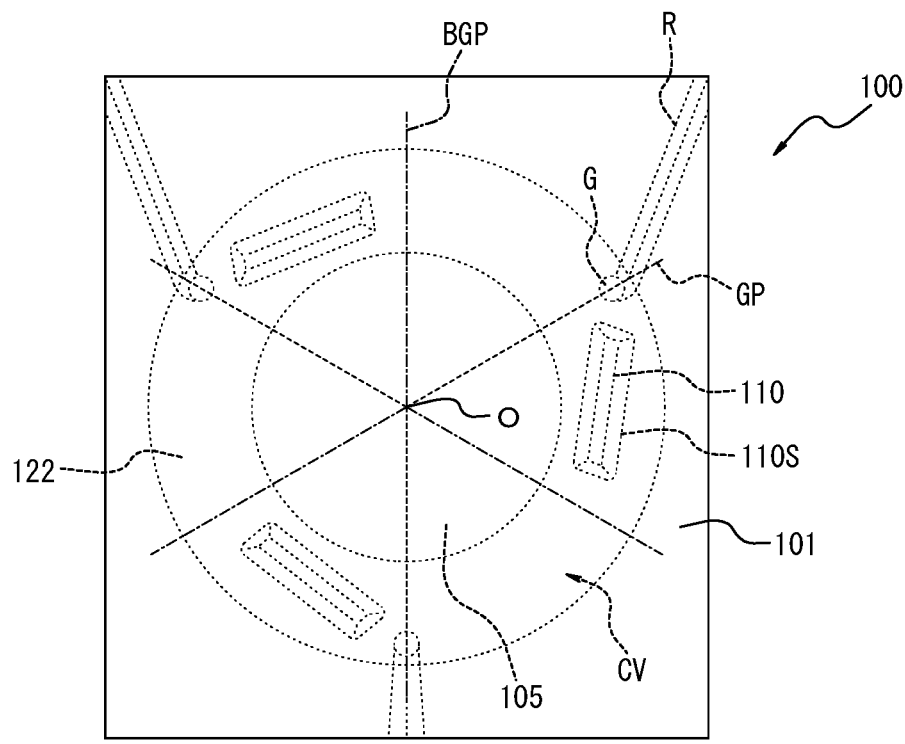
FIG. 3A is a front view illustrating the injection mold of FIG. 1 when observing from one side in the axial direction.
Figure 3B:
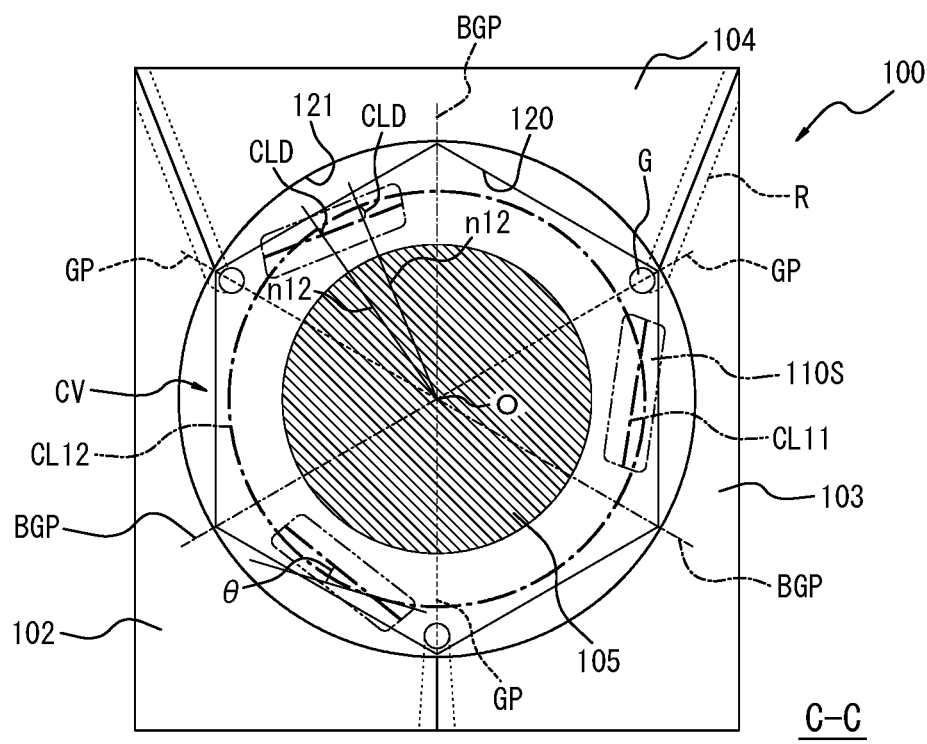
FIG. 3B is a cross-sectional view in the perpendicular-to-axis direction along the line C-C of FIG. 2A that illustrates the injection mold of FIG. 1.

As illustrated in FIG. 3B, the opening end surface 110S of the resin reservoir 110 to the cavity CV (the boundary surface between the resin reservoir 110 and the cavity CV) is formed in a non-circular shape. More specifically, in the present example, the opening end surface 110S is formed in a parallelogram where the length in one direction is longer than the length in the direction perpendicular thereto.

Further, in a first cross section along the opening end surface 110S of the resin reservoir 110 to the cavity CV, the distance CLD between a width center line CL11 of the resin reservoir 110 and a width center line CL12 of the cavity CV, which is measured along a perpendicular line n12 of the width center line CL12 of the cavity CV, is not always constant and changes at least in part along the width center line CL12 of the cavity CV.

The "first cross section" along the opening end surface 110S is a cross section of the mold 100 along a virtual plane including the opening end surface 110S. In the present example, the first cross section is a cross section parallel to the perpendicular-to-axis direction, and is the cross section of FIG. 3B (the cross section taken along the line C-C in FIGS. 2A and 2B).

The "width center line CL11" of the resin reservoir 110 in the first cross section refers to a line passing through the center of the width direction of the opening end surface 110S, where the width direction is the direction perpendicular to the extending direction (longitudinal direction) of the opening end surface 110S in the first cross section. In the present example, it is a line equidistant from two opposed long sides of the parallelogram formed by the opening end surface 110S. In addition, the "perpendicular line n11" of the width center line CL11 of the resin reservoir 110 in the first cross section is a line that is perpendicular to a tangent at an arbitrary point on the width center line CL11 of the resin reservoir 110 and passes through the point.

The "width center line CL12" of the cavity CV in the first cross section is a line passing through the center of the width direction of the cavity CV, where the width direction is the direction perpendicular to the extending direction (longitudinal direction) of the cavity CV in the first cross section. In the present example, it is a line equidistant from the outer circumferential periphery and the inner circumferential periphery of the annular shape formed by the cavity CV in the first cross section. In addition, the "perpendicular line n12" of the width center line CL12 of the cavity CV in the first cross section is a line that is perpendicular to the tangent at an arbitrary point on the width center line CL12 of the cavity CV and passes through the point.

Next, the working of the mold 100, which is configured as described above, will be explained with reference to FIG. 5.

In the molding step, when molten resin containing reinforcing fibers is injected from the gate G into the cavity CV, the molten resin first spreads in the circumferential direction and moves toward the one axial side in the axial direction, first inside the cavity CV that is on the inside of the cavity surface 120 for torque input portion and then inside the cavity CV that is on the inside of the cavity surface 121 for one-axial-side portion, and then flows into the resin reservoir 110. When the cavity CV on the one axial side of the gate G and the resin reservoir 110 are filled with resin, the resin then flows toward the other axial side, inside the cavity CV on the inside of the cavity surface 124 for other-axial-side portion, to fill it with the resin. In this way, the entire cavity CV is filled with the resin.

In the case where the mold 100 is not provided with a resin reservoir 110 and the cavity surface 121 for one-axial-side portion and the cavity surface 122 for one-axial-side end surface are each composed only of a smooth surface without unevenness, the weld portion W tends to be formed in a planar shape parallel to the axial direction and the radial direction at each between-gate position BGP, which is a position (angular position) equidistant between gate positions GP, i.e. the position (angular position) of each gate G, along the cavity CV, in the cavity CV on the inside of the cavity surface 121 for one-axial-side portion which is away from the gate G in the resin flow direction (the axial direction in the present example). This increases the possibility that the reinforcing fibers F in the resin extend (are oriented) parallel to the extending direction of the weld portion W (weld extending direction; the axial direction in the present example) on both sides of the interface between the resins in the weld portion W.

In the present specification, the "resin flow direction" is a direction approximating the rough direction in which the resin injected from the gate G flows in the cavity CV. In the present example, it corresponds to the direction of the gate G and the direction toward the one axial side. In addition, the "weld extending direction" is a direction approximating the extending direction of the weld portion W to one direction, and corresponds to a direction approximating the extending direction of a virtual plane passing through the between-gate position BGP to one direction. In the present example, it is the axial direction. Further, in the present specification, a direction intersecting the weld extending direction may be referred to as a "weld intersecting direction".

In the cavity CV on the inside of the cavity surface 120 for torque input portion, which is close to the gate G in the resin flow direction (the axial direction in the present example), the interface of the high-temperature resins just injected from the gate G during the injection disappears and hardly remains even if the resins join together, rendering it difficult to form a weld portion W. As the resin flows far from the gate G, that is, the resin flows close to the one-axial-side end surface 222, the resin cools with the time elapsed from the injection from the gate G increasing. When the slightly cooled resins join together, the interface tends to remain and a weld portion W tends to be formed.

As described above, in the case where the weld portion W is formed straight along the axial direction and the reinforcing fibers F in the resin of the weld portion W are each oriented parallel to the extending direction of the weld portion W, the resin member 200 as a molded article may not have sufficient strength against the external force in the radial direction. Even if the resin is reinforced with the reinforcing fibers F, when the reinforcing fibers F in the weld portion W are each oriented parallel to the extending direction of the weld portion W, the strength of the weld portion W is actually only the strength of the resin.

The resin member 200 of the present example has a female screw 223 on the inner circumferential side of the one-axial-side portion 221 and the torque input portion 220, and therefore during the construction of the joint 300, for example, the one-axial-side portion 221 and the torque input portion 220 receive a force in the radially expanding direction once an external member with a male screw is screwed into the female screw 223. In this case, if the weld portion W formed on the one-axial-side portion 221 does not have sufficient strength, the one-axial-side portion 221 may be damaged. Therefore, the weld portion W is required to have sufficient strength. In particular, since the female screw 223 of the present example is a tapered female screw, the circumferential wall thickness of the one-axial-side portion 221 is smaller than that of the torque input portion 220, and the thickness decreases as it gets close to the one-axial-side end surface 222. In addition, the force in the radially expanding direction input by the external member with a male screw may increase as compared with the case where the female screw 223 is a parallel female screw. Accordingly, it is highly necessary to improve the strength of the weld portion W, and in particular, the necessity increases as it gets close to the one-axial-side end surface 222.

On the other hand, in the present embodiment, the mold 100 is provided with a resin reservoir 110, and in the first cross section along the opening end surface 110S of the resin reservoir 110 to the cavity CV, the distance CLD between the width center line CL11 of the resin reservoir 110 and the width center line CL12 of the cavity CV, which is measured along the perpendicular line n12 of the width center line CL12 of the cavity CV, is not always constant and changes at least in part along the width center line CL12 of the cavity CV (always changes in the illustrated example), as described above. For this reason, the resin flow is disturbed in a wide range in the width direction of the cavity CV in the cross section perpendicular to the axis (the direction perpendicular to the extending direction of the cavity CV; the thickness direction of the cavity CV) and the resin flows in various directions in three dimensions immediately before the molten resin flows into the resin reservoir 110 during the injection, as schematically illustrated in FIG. 5. As a result, the shape of the weld portion W formed in the vicinity of the between-gate position BGP is not a shape that extends straight in the axial direction, but a shape that is complicatedly disturbed in three dimensions, such as a blurred shape, a slanted shape, or a bent shape when viewed three-dimensionally. The strength of the weld portion W thus can be improved. Further, in the vicinity of the between-gate position BGP and in the vicinity of the weld portion W, the direction of the reinforcing fibers F in the resin is disturbed and the reinforcing fibers F are three-dimensionally oriented in various directions in a wide range in the width direction of the cavity CV in the cross section perpendicular to the axis. Therefore, the ratio of the reinforcing fibers F oriented in a direction intersecting the axial direction and in a weld intersecting direction is increased. This also improves the strength of the weld portion W.

If the distance CLD between the width center line CL11 of the resin reservoir 110 and the width center line CL12 of the cavity CV, which is measured along the perpendicular line n12 of the width center line CL12 of the cavity CV, is always constant along the width center line CL12 of the cavity CV in the first cross section, then the flow direction of the resin and the orientation direction of the reinforcing fibers F cannot be disturbed in a complicated manner or in a wide range in the width direction of the cavity CV in the cross section perpendicular to the axis in the vicinity of the between-gate position BGP and in the vicinity of the weld portion W.

The projection 210 molded by the resin reservoir 110 having the above-described structure has the following structure.

As illustrated in FIG. 7B, a connecting end surface 210S of the projection 210 to the main body MB (the boundary surface between the projection 210 and the main body MB) is formed in a non-circular shape. More specifically, in the present example, the connecting end surface 210S is formed in a parallelogram where the length in one direction is longer than the length in the direction perpendicular thereto.

Further, in a first cross section along the connecting end surface 210S of the projection 210 to the main body MB, the distance CLD' between a width center line CL21 of the projection 210 and a width center line CL22 of the main body MB, which is measured along a perpendicular line n22 of the width center line CL22 of the main body MB, changes at least in part along the width center line CL22 of the main body MB (always changes in the illustrated example).

The "first cross section" along the connecting end surface 210S is a cross section of the resin member 200 along a virtual plane including the connecting end surface 210S. In the present example, the first cross section is a cross section parallel to the perpendicular-to-axis direction.

The "width center line CL21" of the projection 210 in the first cross section refers to a line passing through the center of the width direction of the connecting end surface 210S, where the width direction is the direction perpendicular to the extending direction (longitudinal direction) of the connecting end surface 210S in the first cross section. In the present example, it is a line equidistant from two opposed long sides of the parallelogram formed by the connecting end surface 210S.

The "width center line CL22" of the main body MB in the first cross section is a line passing through the center of the width direction of the main body MB, where the width direction is the direction perpendicular to the extending direction (longitudinal direction) of the main body MB in the first cross section. In the present example, it is a line equidistant from the outer circumferential periphery and the inner circumferential periphery of the annular shape formed by the main body MB in the first cross section. In addition, the "perpendicular line n22" of the width center line CL22 of the main body MB in the first cross section is a line that is perpendicular to the tangent at an arbitrary point on the width center line CL22 of the main body MB and passes through the point, when the width center line CL22 of the main body MB is nonlinear as in the present example.

In FIGS. 7A to 8B, the gate G, the gate position GP, and the between-gate position BGP are illustrated together with the resin member 200 for convenience. A trace of the gate G formed during the injection molding may remain at the position of the gate G on the resin member 200. From the trace of the gate G of the resin member 200, the position of the gate G and the direction of the gate G (and the direction in which the resin is injected from the gate G) can be specified. Based on this information and the shape of the cavity CV specified from the shape of the resin member 200, the resin flow direction inside the cavity CV, the gate position GP, and the between-gate position BGP can be specified.

For the resin member 200 having a projection 210 with the above-described structure, the shape of the weld portion W formed in the vicinity of the between-gate position BGP in the one-axial-side portion 221 during the injection molding is not a shape that extends straight in the axial direction, but a shape that is complicatedly disturbed in three dimensions, as described above with respect to the working effects of the resin reservoir 110 of the mold 100. The strength of the weld portion W thus can be improved. Further, in the vicinity of the between-gate position BGP and in the vicinity of the weld portion W, the direction of the reinforcing fibers F in the resin is disturbed and the reinforcing fibers F are three-dimensionally oriented in various directions in a wide range in the width direction of the main body MB (the thickness direction of the main body MB) in the cross section perpendicular to the axis. Therefore, the ratio of the reinforcing fibers F oriented in a direction intersecting the axial direction and in a weld intersecting direction is increased. This also improves the strength of the weld portion W.

In the example of FIGS. 3A and 3B, the three resin reservoirs 110 of the mold 100 have the same structure with each other, and when the three resin reservoirs 110 are viewed as a unit, the structure is made to be 120-degree symmetrical (also referred to as three-fold symmetrical) so as to overlap with itself when rotated around the central axis O of the cavity CV by 120° (360°/3). Not only in the present example, when the mold 100 has n (n≥2) resin reservoirs 110, the structure when the n resin reservoirs 110 are viewed as a unit may be made to be (360/n)-degree symmetrical (also referred to as n-fold symmetrical) so as to overlap with itself when rotated around the central axis O of the cavity CV by (360/n)°. Alternatively, the plurality of resin reservoirs 110 of the mold 100 may have different structures from each other.

The example of FIGS. 7A and 7B is in a similar manner with the above, where the three projections 210 of the resin member 200 have the same structure with each other, and when the three projections 210 are viewed as a unit, the structure is made to be 120-degree symmetrical (also referred to as three-fold symmetrical) so as to overlap with itself when rotated around the central axis O of the main body MB by 120°. Not only in the present example, when the resin member 200 has n (n≥2) projections 210, the structure when the n projections 210 are viewed as a unit may be made to be (360/n)-degree symmetrical (also referred to as n-fold symmetrical) so as to overlap with itself when rotated around the central axis O of the main body MB by (360/n)°. Alternatively, the plurality of projections 210 of the resin member 200 may have different structures from each other.

In the mold 100 of FIGS. 3A and 3B, the width center line CL11 of the resin reservoir 110 extends in a direction intersecting at a non-right angle with respect to the width center line CL12 of the cavity CV in the first cross section along the opening end surface 110S of the resin reservoir 110 to the cavity CV. In the first cross section of the present example, the width center line CL11 of the resin reservoir 110 is linear, and the width center line CL12 of the cavity CV is nonlinear (circular).

The words that the width center line CL11 of the resin reservoir 110 "extends in a direction intersecting at a non-right angle" with respect to the width center line CL12 of the cavity CV in the first cross section mean that at the intersection of the width center line CL11 of the resin reservoir 110 (the extension line of the width center line CL11 of the resin reservoir 110 if the width center line CL11 of the resin reservoir 110 does not intersect the width center line CL12 of the cavity CV) and the width center line CL12 of the cavity CV in the first cross section, the smaller intersection angle θ between the tangent of the width center line CL11 of the resin reservoir 110 and the tangent of the width center line CL12 of the cavity CV at the intersection is greater than 0° and less than 90°.

According to this structure, the shape of the weld portion W and the orientation (extending direction) of the reinforcing fibers F in the vicinity of the between-gate position BGP and in the vicinity of the weld portion W can be disturbed in a wider range and more complicatedly than in the case where the width center line CL11 of the resin reservoir 110 does not extend in a direction intersecting at a non-right angle with respect to the width center line CL12 of the cavity CV, that is, in the case where the width center line CL11 of the resin reservoir 110 extends in a direction along the width center line CL12 of the cavity CV, or extends in a direction perpendicular to the width center line CL12 of the cavity CV (the radial direction in the present example), for example. As a result, the strength of the weld portion W can be improved.

The resin member 200 of FIGS. 7A and 7B is in a similar manner with the above, where the width center line CL21 of the projection 210 extends in a direction intersecting at a non-right angle with respect to the width center line CL22 of the main body MB in the first cross section along the connecting end surface 210S of the projection 210 to the main body MB. In the first cross section of the present example, the width center line CL21 of the projection 210 is linear, and the width center line CL22 of the main body MB is nonlinear (circular).

The words that the width center line CL21 of the projection 210 "extends in a direction intersecting at a non-right angle" with respect to the width center line CL22 of the main body MB in the first cross section mean that at the intersection of the width center line CL21 of the projection 210 (the extension line of the width center line CL21 of the projection 210 if the width center line CL21 of the projection 210 does not intersect the width center line CL22 of the main body MB) and the width center line CL22 of the main body MB in the first cross section, the smaller intersection angle θ' between the tangent of the width center line CL21 of the projection 210 and the tangent of the width center line CL22 of the main body MB at the intersection is greater than 0° and less than 90°.

Returning to FIGS. 3A and 3B, from the viewpoint of improving the strength of the weld portion W, it is preferable for the mold 100 that at the intersection of the width center line CL11 of the resin reservoir 110 (the extension line of the width center line CL11 of the resin reservoir 110 if the width center line CL11 of the resin reservoir 110 does not intersect the width center line CL12 of the cavity CV) and the width center line CL12 of the cavity CV in the first cross section, the smaller intersection angle θ between the tangent of the width center line CL11 of the resin reservoir 110 and the tangent of the width center line CL12 of the cavity CV at the intersection be 10° to 30°.

Referring to FIGS. 7A and 7B, the resin member 200 is in a similar manner with the above, where at the intersection of the width center line CL21 of the projection 210 (the extension line of the width center line CL21 of the projection 210 if the width center line CL21 of the projection 210 does not intersect the width center line CL22 of the main body MB) and the width center line CL22 of the main body MB in the first cross section, the smaller intersection angle θ' between the tangent of the width center line CL21 of the projection 210 and the tangent of the width center line CL22 of the main body MB at the intersection is preferably 10° to 30°.

With respect to the structure related to the weld portion W, the structure and working effects of the resin member 200 correspond to the structure and working effects of the mold 100. For the sake of simplicity, the following describes the structure and working effects of the mold 100 and the structure of the resin member 200, and may omit the description of the working effects of the resin member 200.

In the mold 100 of FIGS. 3A and 3B, the width center line CL11 of the resin reservoir 110 in the first cross section not only extends in a direction intersecting at a non-right angle with respect to the width center line CL12 of the cavity CV in the first cross section, but also actually intersects at a non-right angle with respect to the width center line CL12.

According to this structure, the shape of the weld portion W and the orientation (extending direction) of the reinforcing fibers F in the vicinity of the between-gate position BGP and in the vicinity of the weld portion W can be disturbed in a wider range and more complicatedly than in the case where there is no actual intersection. As a result, the strength of the weld portion W can be improved.

The resin member 200 of FIGS. 7A and 7B is in a similar manner with the above, where the width center line CL21 of the projection 210 in the first cross section not only extends in a direction intersecting at a non-right angle with respect to the width center line CL22 of the main body MB in the first cross section, but also actually intersects at a non-right angle with respect to the width center line CL22.

In the mold 100 of FIGS. 3A and 3B, the width center line CL11 of the resin reservoir 110 in the first cross section has a part where the distance to the central axis O of the cavity CV is not constant over the entire length and changes along the width center line CL11. More specifically, in the present example, the distance from the width center line CL11 of the resin reservoir 110 in the first cross section to the central axis O of the cavity CV changes along the width center line CL11 over the entire length.

According to this structure, the shape of the weld portion W and the orientation (extending direction) of the reinforcing fibers F in the vicinity of the between-gate position BGP and in the vicinity of the weld portion W can be disturbed in a wider range and more complicatedly. As a result, the strength of the weld portion W can be improved.

The resin member 200 of FIGS. 7A and 7B is in a similar manner with the above, where the width center line CL21 of the projection 210 in the first cross section has a part where the distance to the central axis O of the main body MB is not constant over the entire length and changes along the width center line CL21. More specifically, in the present example, the distance from the width center line CL21 of the projection 210 in the first cross section to the central axis O of the main body MB changes along the width center line CL21 over the entire length.

In the mold 100 of FIGS. 3A and 3B, the distance from the end portion on one side of the width center line CL11 of the resin reservoir 110 in the first cross section to the central axis O of the cavity CV is longer than the distance from the end portion on the other side of the width center line CL11 to the central axis O of the cavity CV. More specifically, for the width center line CL11 of the resin reservoir 110 in the first cross section of the present example, the distance to the central axis O of the cavity CV gradually increases from the end portion on one side toward the end portion on the other side of the width center line CL11 over the entire length.

According to this structure, the shape of the weld portion W and the orientation of the reinforcing fibers F in the vicinity of the between-gate position BGP and in the vicinity of the weld portion W can be disturbed in a wider range and more complicatedly. As a result, the strength of the weld portion W can be improved.

The resin member 200 of FIGS. 7A and 7B is in a similar manner with the above, where the distance from the end portion on one side of the width center line CL21 of the projection 210 in the first cross section to the central axis O of the main body MB is longer than the distance from the end portion on the other side of the width center line CL21 to the central axis O of the main body MB. More specifically, for the width center line CL21 of the projection 210 in the first cross section of the present example, the distance to the central axis O of the main body MB gradually increases from the end portion on one side toward the end portion on the other side of the width center line CL21 over the entire length.

In the mold 100 of FIGS. 3A and 3B, the outer edge of the opening end surface 110S of the resin reservoir 110 to the cavity CV is formed in a parallelogram shape with non-perpendicular diagonals.

According to this structure, the shape of the weld portion W and the orientation of the reinforcing fibers F in the vicinity of the between-gate position BGP and in the vicinity of the weld portion W can be disturbed in a wider range and more complicatedly. As a result, the strength of the weld portion W can be improved.

The resin member 200 of FIGS. 7A and 7B is in a similar manner with the above, where the outer edge of the connecting end surface 210S of the projection 210 to the main body MB is formed in a parallelogram shape with non-perpendicular diagonals.

In the mold 100 of FIGS. 3A and 3B, the opening end surface 110S of the resin reservoir 110 to the cavity CV does not overlap with the between-gate position BGP, and is at a position (angular position) deviated from the between-gate position BGP (and the weld portion W).

According to this structure, the molten resin tends to flow toward the resin reservoir 110 and away from the between-gate position BGP before flowing into the resin reservoir 110 during the injection, as schematically illustrated in FIG. 5. In this way, the resin flow is disturbed in the vicinity of the between-gate position BGP and in the vicinity of the weld portion W, so that the shape of the weld portion W and the orientation of the reinforcing fibers F in the vicinity of the between-gate position BGP and in the vicinity of the weld portion W can be disturbed in a wider range and more complicatedly. As a result, the strength of the weld portion W can be improved.

The resin member 200 of FIGS. 7A and 7B is in a similar manner with the above, where the connecting end surface 210S of the projection 210 to the main body MB does not overlap with the between-gate position BGP, and is at a position (angular position) deviated from the between-gate position BGP (and the weld portion W).

In the mold 100 of FIGS. 3A and 3B, the opening end surface 110S of the resin reservoir 110 to the cavity CV does not overlap with the gate position GP, and is at a position (angular position) between the gate position GP and the between-gate position BGP.

According to this structure, the opening end surface 110S of the resin reservoir 110 is not too far from the between-gate position BGP, which can effectively urge the molten resin in the vicinity of the between-gate position BGP to flow toward the resin reservoir 110.

The resin member 200 of FIGS. 7A and 7B is in a similar manner with the above, where the connecting end surface 210S of the projection 210 to the main body MB does not overlap with the gate position GP, and is at a position (angular position) between the gate position GP and the between-gate position BGP.

In the mold 100 of FIGS. 2A and 2B, the resin reservoir 110 is open to the cavity surface 122 for one-axial-side end surface. In addition, the resin reservoir 110 extends toward the one axial side, and more specifically, extends in the axial direction. That is, in the present example, the extending direction of the resin reservoir 110 is the same as the resin flow direction. However, the extending direction of the resin reservoir 110 may be a direction inclined to the axial direction.

With this structure, it is possible to effectively disturb the resin flow in the vicinity of the one-axial-side end portion, which is a region farthest from the gate G where the weld portion W is particularly easily formed and a region where the strength of the weld portion W is most required, and to improve the strength of the weld portion W, as compared with, for example, the case where the resin reservoir 110 is open to a cavity surface for outer circumferential surface (for example, the cavity surface 121 for one-axial-side portion or the cavity surface 120 for torque input portion) and extends in the radial direction.

The resin member 200 of FIGS. 7A and 7B is in a similar manner with the above, where the projection 210 is connected to the one-axial-side end surface 222. In addition, the projection 210 extends toward the one axial side, and more specifically, extends in the axial direction. That is, in the present example, the extending direction of the projection 210 is the same as the resin flow direction. However, the extending direction of the projection 210 may be a direction inclined to the axial direction.

In the mold 100 of FIGS. 3A, 3B and 4, the area of the cross section perpendicular to the axial direction (the extending direction of the resin reservoir 110 in the present example) of the resin reservoir 110 is largest at the opening end surface 110S to the cavity CV. More specifically, in the illustrated example, the area of the cross section perpendicular to the axial direction (the extending direction of the resin reservoir 110 in the present example) of the resin reservoir 110 is constant from the opening end surface 110S (base) to the front of the tip portion, and only at the tip portion, the cross section area gradually decreases as it goes toward the tip.

According to this structure, the effect of the resin reservoir 110 of disturbing the resin flow can be increased. In addition, it is possible to easily remove the outer mold portion 101 from the projection 210 during mold release while guaranteeing a sufficient volume of the resin reservoir 110.

The resin member 200 of FIGS. 7A and 7B is in a similar manner with the above, where the area of the cross section perpendicular to the axial direction (the extending direction of the projection 210 in the present example) of the projection 210 is largest at the connecting end surface 210S to the main body MB. More specifically, in the illustrated example, the area of the cross section perpendicular to the axial direction (the extending direction of the projection 210 in the present example) of the projection 210 is constant from the connecting end surface 210S (base) to the front of the tip portion, and only at the tip portion, the cross section area gradually decreases as it goes toward the tip.

The mold 100 may be configured in a way where the cavity CV does not form a female screw 223. In that case, the weld portion W may not be required to have a high strength. However, the mold 100 may be configured such that the cavity CV forms a female screw 223 on the inner circumferential surface of at least one side in the axial direction of the main body MB which is a cylindrical member, as in the present example. Even in such a case, the strength of the weld portion can be sufficiently guaranteed.

The resin member 200 is in a similar manner with the above, where the main body MB, which is a cylindrical member, may have no female screw 223, or may have a female screw on the inner circumferential surface of at least one side in the axial direction of the main body MB, as in the present example.

In the case where the mold 100 is configured to mold a female screw 223, it is preferable that the resin reservoir 110 be open to a cavity surface for molding the end surface 222 on the side where the female screw 223 is molded (the cavity surface 122 for one-axial-side end surface in the present example) of the two sides in the axial direction of the main body MB which is a cylindrical member, as in the present example.

According to this structure, the strength of the weld portion W can be sufficiently guaranteed around the female screw where strength is particularly required.

The resin member 200 is in a similar manner with the above, where in the case of having a female screw 223, it is preferable that the projection 210 be connected to an end surface on the side having the female screw 223 (the one-axial-side end surface 222 in the present example) of the two sides in the axial direction of the main body MB which is a cylindrical member, as in the present example.

Embodiment 2

Figure 9A:
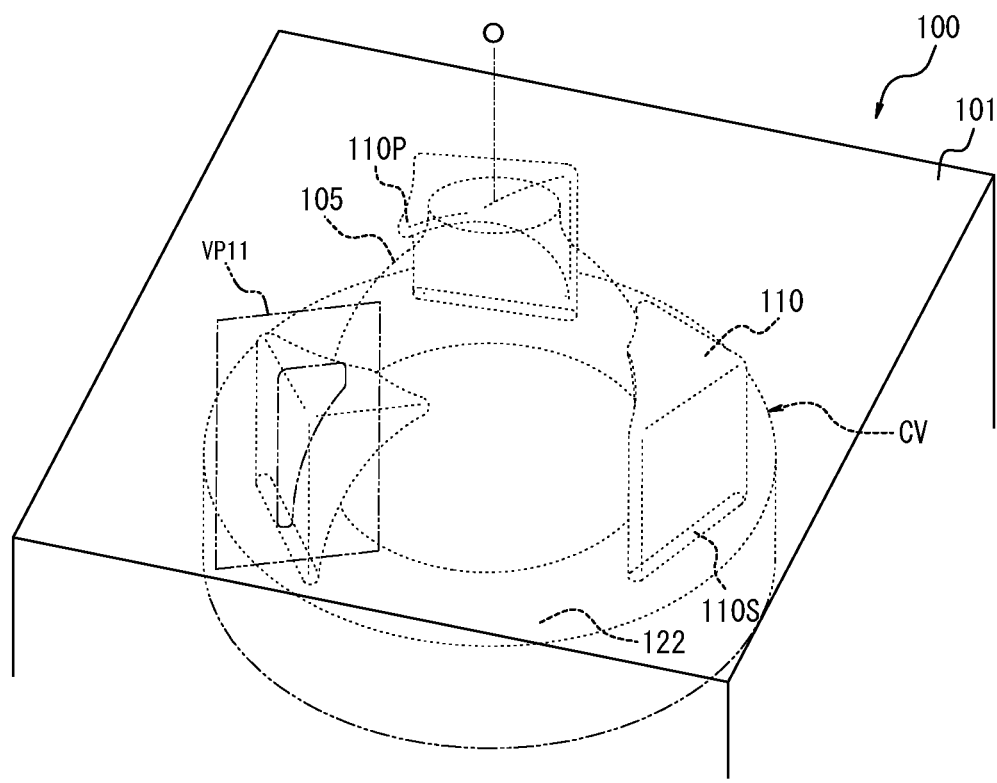
FIG. 9A is a perspective view illustrating a main part of the injection mold of Embodiment 2 of the present disclosure when observing from one side in the axial direction.
Figure 9B:
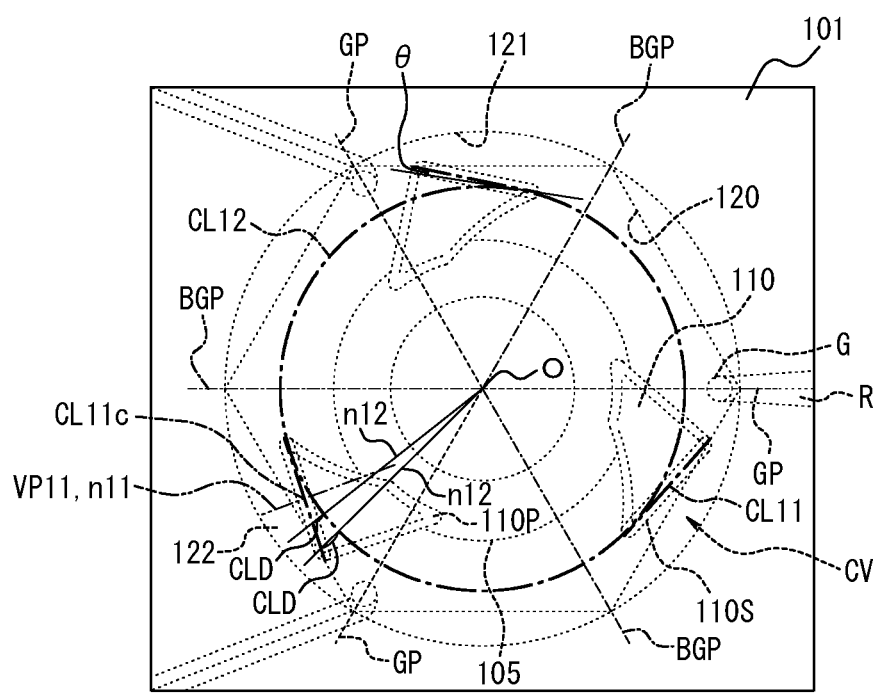
FIG. 9B is a front view illustrating the injection mold of FIG. 9A when observing from one side in the axial direction.
Figure 10A:
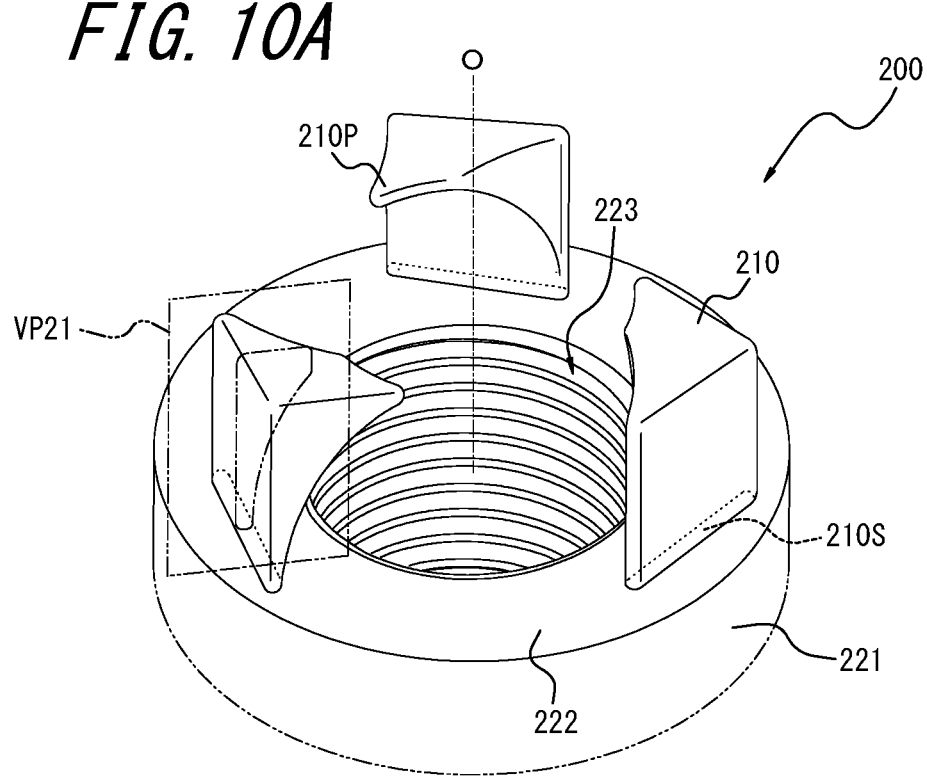
FIG. 10A is a perspective view illustrating a main part of the resin member of Embodiment 2 of the present disclosure when observing from one side in the axial direction.
Figure 10B:
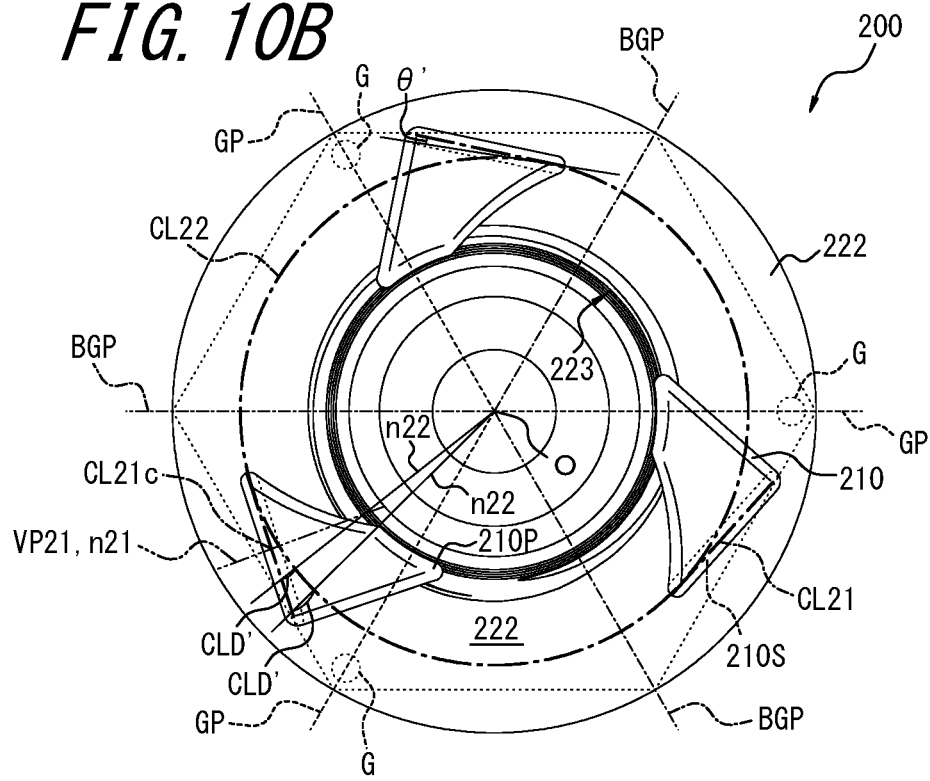
FIG. 10B is a front view illustrating the resin member of FIG. 10A when observing from one side in the axial direction.

Embodiment 2 of the present disclosure will be described with a focus on the differences from Embodiment 1 with reference to FIGS. 9A to 10B. FIGS. 9A and 9B illustrate a mold 100 of the present embodiment. FIGS. 10A and 10B illustrate a resin member 200 of the present embodiment.

Embodiment 2 is different from Embodiment 1 only in the shape of the resin reservoir 110 of the mold 100 and the shape of the projection 210 of the resin member 200. The structure of the cavity CV and the arrangement of the resin reservoir 110 of the mold 100, and the structure of the main body MB and the arrangement of the projection 210 of the resin member 200 are the same as that of Embodiment 1.

The mold 100 of FIGS. 9A and 9B is in a similar manner with that of Embodiment 1, where in the first cross section along the opening end surface 110S of the resin reservoir 110 to the cavity CV, the distance CLD between a width center line CL11 of the resin reservoir 110 and a width center line CL12 of the cavity CV, which is measured along the perpendicular line n12 of the width center line CL12 of the cavity CV, is not always constant and changes at least in part along the width center line CL12 of the cavity CV (always changes in the illustrated example). In addition, the width center line CL11 of the resin reservoir 110 in the first cross section along the opening end surface 110S of the resin reservoir 110 to the cavity CV extends in a direction intersecting at a non-right angle with respect to the width center line CL12 of the cavity CV in the first cross section and intersects at a non-right angle with respect to the width center line CL12.

Further, the resin member 200 of FIGS. 10A and 10B is in a similar manner with that of Embodiment 1, where in the first cross section along the connecting end surface 210S of the projection 210 to the main body MB, the distance CLD' between the width center line CL21 of the projection 210 and the width center line CL22 of the main body MB, which is measured along the perpendicular line n22 of the width center line CL22 of the main body MB, changes at least in part along the width center line CL22 of the main body MB (always changes in the illustrated example). Furthermore, the width center line CL21 of the projection 210 in the first cross section along the connecting end surface 210S of the projection 210 to the main body MB extends in a direction intersecting at a non-right angle with respect to the width center line CL22 of the main body MB in the first cross section and intersects at a non-right angle with respect to the width center line CL22.

In the mold 100 of FIGS. 9A and 9B, the tip-side portion of the resin reservoir 110 (a portion on the tip side having a length half the total length in the axial direction of the resin reservoir 110) has an asymmetric shape with respect to a first virtual plane VP11 that includes the perpendicular line n11 of the width center line CL11 of the resin reservoir 110 in the first cross section passing through the center point CL11c of the width center line CL11 of the resin reservoir 110 in the first cross section along the opening end surface 110S to the cavity CV and is perpendicular to the first cross section. In addition, the resin reservoir 110 has different volumes on two sides of the first virtual plane VP11 at the tip-side portion. That is, at the tip-side portion, the volume of the part on one side of the first virtual plane VP11 is larger than the volume of the part on the other side of the first virtual plane VP11.

As a result, when a part of the molten resin flows into the resin reservoir 110 during the injection, the flow of the resin inside the resin reservoir 110 further disturbs the flow of the resin before flowing into the resin reservoir 110. In this way, the shape of the weld portion W and the orientation of the reinforcing fibers F in the vicinity of the between-gate position BGP and in the vicinity of the weld portion W can be disturbed in a wider range and more complicatedly. The strength of the weld portion W thus can be improved.

The resin member 200 of FIGS. 10A and 10B is in a similar manner with the above, where the tip-side portion of the projection 210 (a portion on the tip side having a length half the total length in the axial direction of the projection 210) has an asymmetric shape with respect to a first virtual plane VP21 that includes a perpendicular line n21 of the width center line CL21 of the projection 210 in the first cross section passing through the center point CL21c of the width center line CL21 of the projection 210 in the first cross section along the connecting end surface 210S to the main body MB and is perpendicular to the first cross section. In addition, the projection 210 has different volumes on two sides of the first virtual plane VP21 at the tip-side portion. That is, at the tip-side portion, the volume of the part on one side of the first virtual plane VP21 is larger than the volume of the part on the other side of the first virtual plane VP21.

The mold 100 of FIGS. 9A and 9B is provided with a plurality of (three in the illustrated example) resin reservoirs 110, and for each resin reservoir 110, the volume of the part on the same side in the circumferential direction of each first virtual plane VP11 is larger than the volume of the part on the other side of each first virtual plane VP11. Further, in the present example, the resin reservoir 110 has a tip protrusion 110P that protrudes toward the inner circumferential side of the cavity CV at the tip-side portion. The tip protrusion 110P of each resin reservoir 110 is located on the same side in the circumferential direction of each first virtual plane VP11.

This can increase the effect of the resin reservoir 110 of disturbing the resin flow, thereby improving the strength of the weld portion W.

The resin member 200 of FIGS. 10A and 10B is in a similar manner with the above, where the resin member 200 is provided with a plurality of (three in the illustrated example) projections 210, and for each projection 210, the volume of the part on the same side in the circumferential direction of each first virtual plane VP21 is larger than the volume of the part on the other side of each first virtual plane VP21. Further, in the present example, the projection 210 has a tip protrusion 210P that protrudes toward the inner circumferential side of the main body MB at the tip-side portion. The tip protrusion 210P of each projection 210 is located on the same side in the circumferential direction of each first virtual plane VP21.

For the tip-side portion of the resin reservoir 110 of the mold 100 of FIGS. 9A and 9B, the area of the cross section that includes the perpendicular n11 of the width center line CL11 of the resin reservoir 110 in the first cross section and is parallel to the extending direction of the resin reservoir 110 (the axial direction in the present example) is not constant over the entire length of the width center line CL11 of the resin reservoir 110, and changes at least in part along the width center line CL11 of the resin reservoir 110. More specifically, in the illustrated example, it always changes along the width center line CL11 of the resin reservoir 110.

This can increase the effect of the resin reservoir 110 of disturbing the resin flow, thereby improving the strength of the weld portion W.

The resin member 200 of FIGS. 10A and 10B is in a similar manner with the above, where for the tip-side portion of the projection 210 of the resin member 200, the area of the cross section that includes the perpendicular line n21 of the width center line CL21 of the projection 210 in the first cross section and is parallel to the extending direction of the projection 210 (the axial direction in the present example) is not constant over the entire length of the width center line CL21 of the projection 210, and changes at least in part along the width center line CL21 of the projection 210. More specifically, in the illustrated example, it always changes along the width center line CL21 of the projection 210.

For the resin reservoir 110 of the mold 100 of FIGS. 9A and 9B, the volume of the tip-side portion is larger than the volume of the base-side portion (a portion on the base side having a length half the total length in the axial direction of the resin reservoir 110). More specifically, for the resin reservoir 110 in the example of FIGS. 9A and 9B, the area of the cross section perpendicular to the axial direction gradually increases from the opening end surface 110S (base) toward the tip along the axial direction over the entire length in the axial direction.

According to this structure, the volume of the tip-side portion of the resin reservoir 110 is guaranteed. As a result, the function of the resin reservoir 110 of disturbing the resin flow can be guaranteed, and in the removal step after the molding step, the projection 210 molded by the resin reservoir 110 can be easily removed from the base side by cutting or other means.

The resin member 200 of FIGS. 10A and 10B is in a similar manner with the above, where for the projection 210 of the resin member 200, the volume of the tip side portion is larger than the volume of the base-side portion (a portion on the base side having a length half the total length in the axial direction of the projection 210). More specifically, for the projection 210 in the example of FIGS. 10A and 10B, the area of the cross section perpendicular to the axial direction gradually increases from the connecting end surface 210S (base) toward the tip along the axial direction over the entire length in the axial direction.

Embodiment 3

Figure 11:
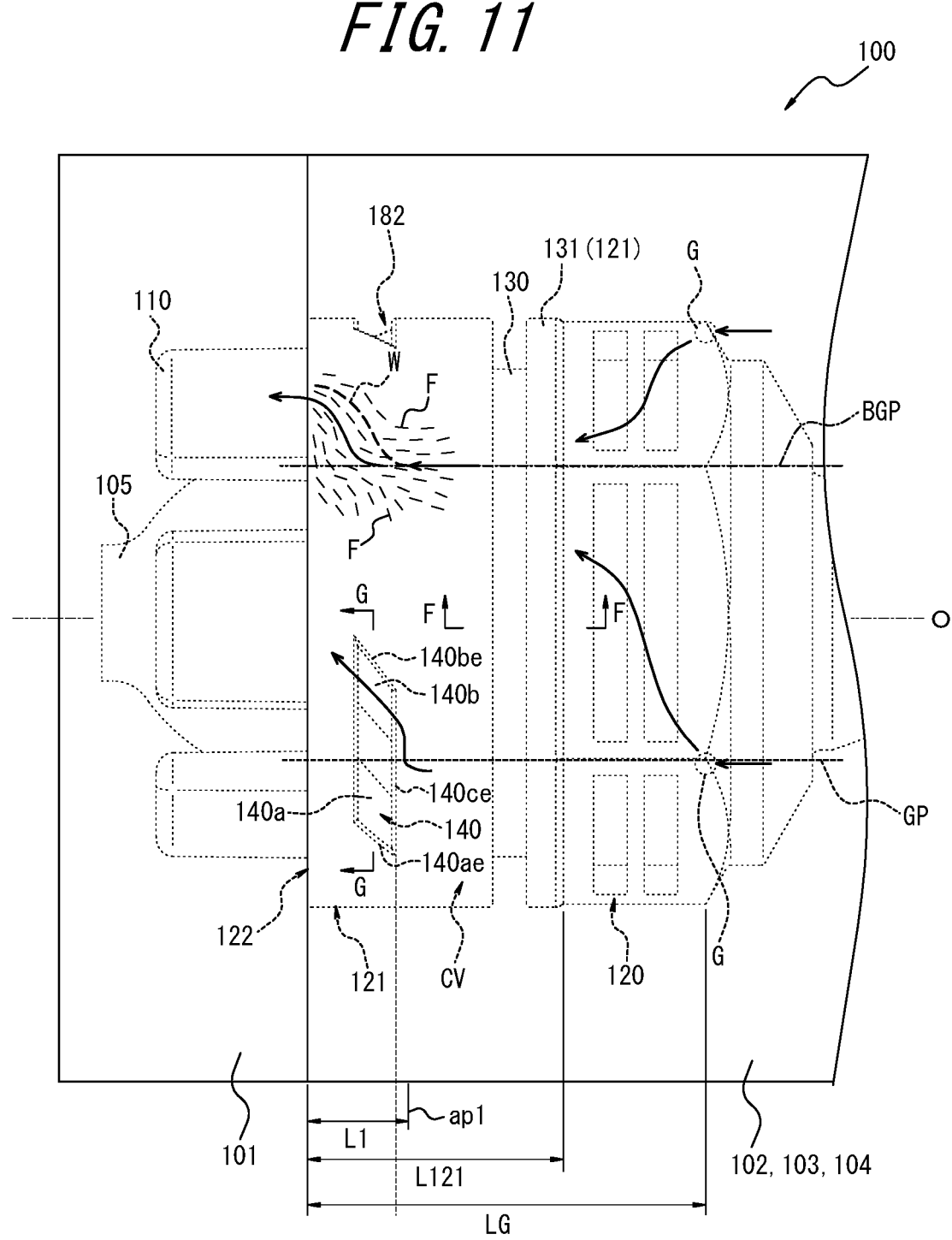
FIG. 11 is an enlarged side view illustrating a main part of the injection mold of Embodiment 3 of the present disclosure, and is a view explaining the working of Embodiment 3 of the present disclosure.
Figure 13:
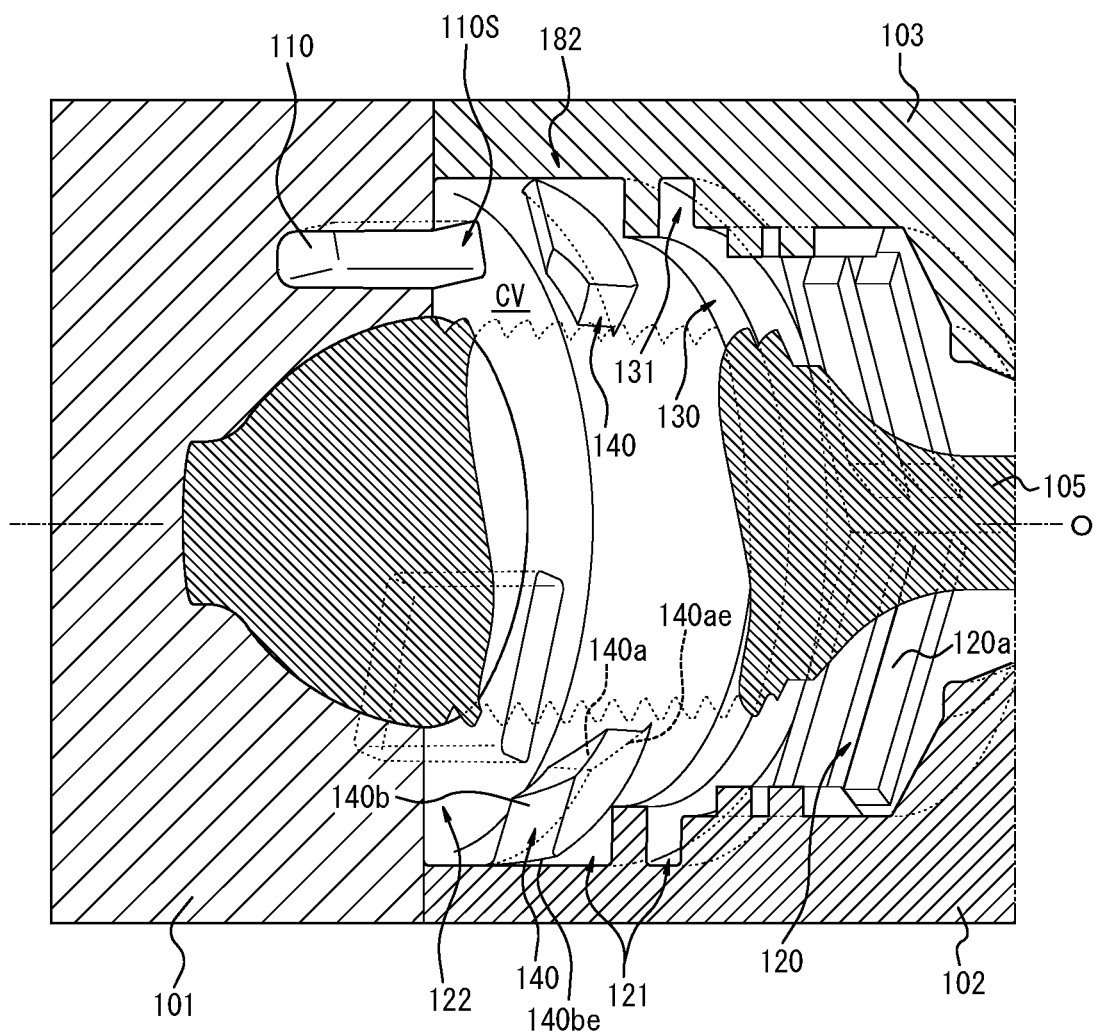
FIG. 13 is a partial cross-sectional perspective view, which illustrates the main part of the injection mold of FIG. 11 in a partial cross-sectional view in the axial direction and in a perspective view.
Figure 14:
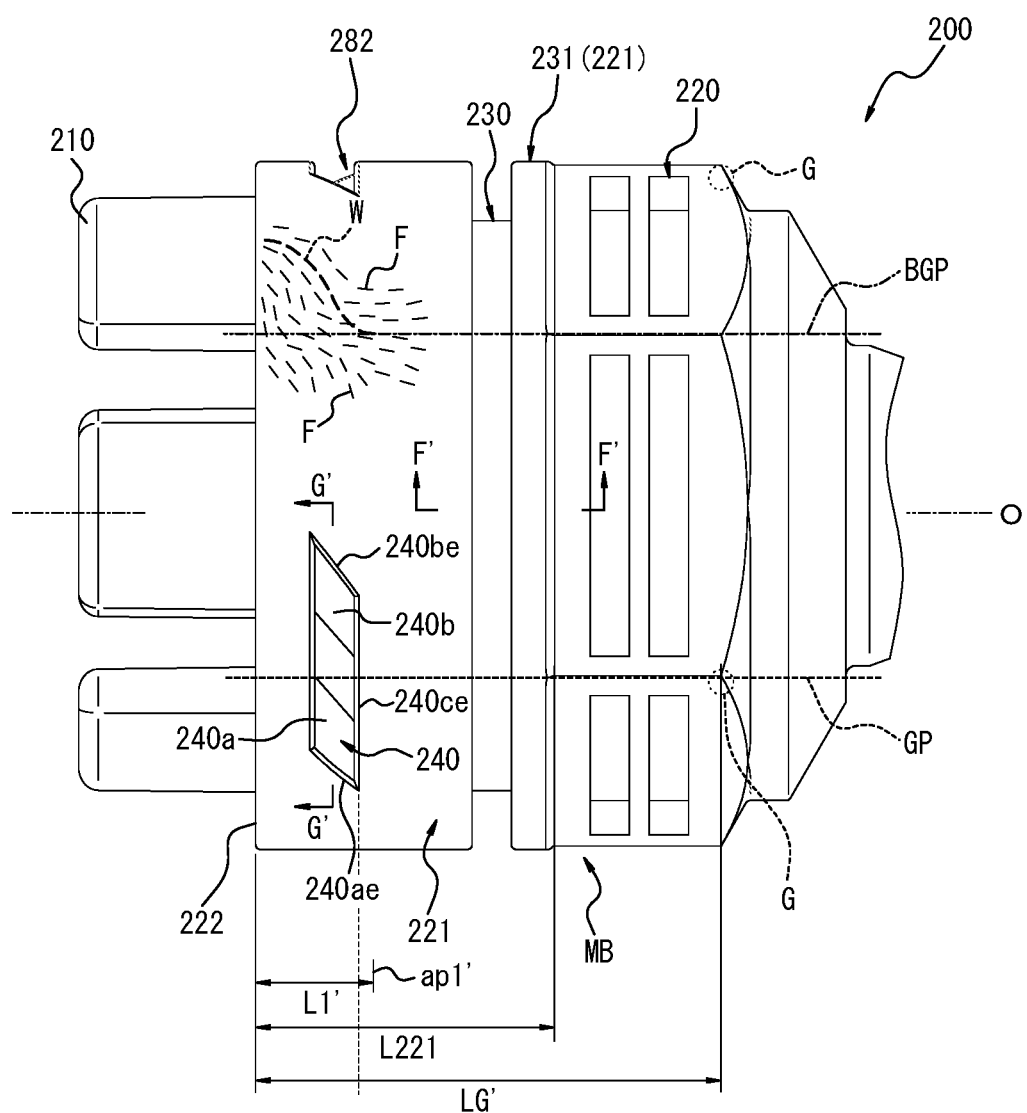
FIG. 14 is an enlarged side view illustrating a main part of the resin member of Embodiment 3 of the present disclosure.

Embodiment 3 of the present disclosure will be described with a focus on the differences from Embodiment 1 with reference to FIGS. 11 to 15B. FIGS. 11 to 13 illustrate a mold 100 of the present embodiment. FIGS. 14 to 15B illustrate a resin member 200 of the present embodiment.

Embodiment 3 is different from Embodiment 1 only in the structure of the cavity surface 121 for the one-axial-side portion of the mold 100 and the structure of the one-axial-side portion 221 of the resin member 200. The structure of the resin reservoir 110 of the mold 100 and the structure of the projection 210 of the resin member 200 are the same as that of Embodiment 1.

As illustrated in FIGS. 11 and 13, the mold 100 of the present example has an annular ridge portion 130 extending in the circumferential direction on the one axial side, which is the downstream side in the resin flow direction, with respect to the cavity surface 120 for torque input portion, that is, on the cavity surface 121 for one-axial-side portion, and protruding to the inside of the cavity CV. The annular ridge portion 130 is configured to mold an annular groove portion 230 in the resin member 200. In the present example, the annular ridge portion 130 extends continuously in the circumferential direction.

According to this structure, the molten resin injected from the gate G moves slightly to the one axial side and then once stagnates in front of the annular ridge portion 130 to disturb the resin flow. This makes the flow uniform so that the resin flows in a weld intersecting direction (particularly in the circumferential direction). As a result, the interface between the resins there is reduced, and the orientation of the reinforcing fibers F in the resin is also made uniform so as to be directed in a weld intersecting direction (particularly in the circumferential direction). Then, after getting over the annular ridge portion 130, the resin proceeds to the one axial side while keeping the flow uniform. As a result, it is possible to suppress the formation of weld portion W and increase the ratio of the reinforcing fibers F oriented in a direction intersecting the axial direction and in a weld intersecting direction, in the region from the annular ridge portion 130 to the cavity surface 122 for one-axial-side end surface. The strength of the weld portion W thus can be improved. The reason why the annular ridge portion 130 is arranged in the cavity surface 121 for one-axial-side portion is that the weld portion W is easily formed in the cavity CV inside the cavity surface 121 for one-axial-side portion while it is difficult to form the weld portion W in the cavity CV inside the cavity surface 120 for torque input portion, as described above.

The resin member 200 of the present example is in a similar manner with the above, where the resin member 200 has an annular groove portion 230 extending in the circumferential direction on the one axial side, which is the downstream side in the resin flow direction, with respect to the torque input portion 220, that is, on the outer circumferential surface of the one-axial-side portion 221, as illustrated in FIG. 14. In the present example, the annular groove portion 230 extends continuously in the circumferential direction. In the resin member 200, the resin flow direction can be specified from the trace of the gate G of the resin member 200, as described above.

Figure 12A:
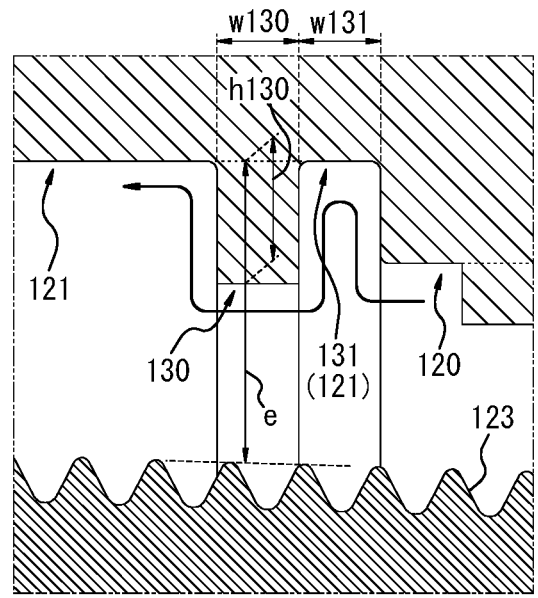
FIG. 12A is a cross-sectional view along the line F-F of FIG. 11.

As illustrated in FIG. 12A, for the mold 100 of the present example, it is preferable that the height h130 of the annular ridge portion 130 when measured along the radial direction be 25% or more of the thickness e of the cavity CV when measured along the radial direction at the same position where the height h130 of the annular ridge portion 130 is measured. In this way, it is possible to provide the annular ridge portion 130 with a sufficient height and to effectively exhibit the function of the annular ridge portion 130 of making the resin flow uniform.

Further, in the mold 100 of the present example, it is preferable that the height h130 of the annular ridge portion 130 when measured along the radial direction be 50% or less of the thickness e of the cavity CV when measured along the radial direction at the same position where the height h130 of the annular ridge portion 130 is measured. In this way, it is possible to prevent the depth of the annular groove portion 230 molded by the annular ridge portion 130 from being deep, and to suppress a decrease in strength of the resin member 200.

The "thickness e of the cavity CV" when measured along the radial direction corresponds to the thickness of the circumferential wall of the cylindrical shape formed by the cavity CV. In the case where a cavity surface 123 for female screw is provided on the inner circumferential side of the cavity CV as in the present example, it is the length obtained by measuring the distance from a lower end to an upper end, where the lower end is a position on the most outer circumferential side of the cavity surface 123 for female screw, and the upper end is a position on the base end surface of the annular ridge portion 130 (the extension surface from the cavity surface 121 for one-axial-side portion adjacent to the one axial side of the annular ridge portion 130).

Figure 15A:
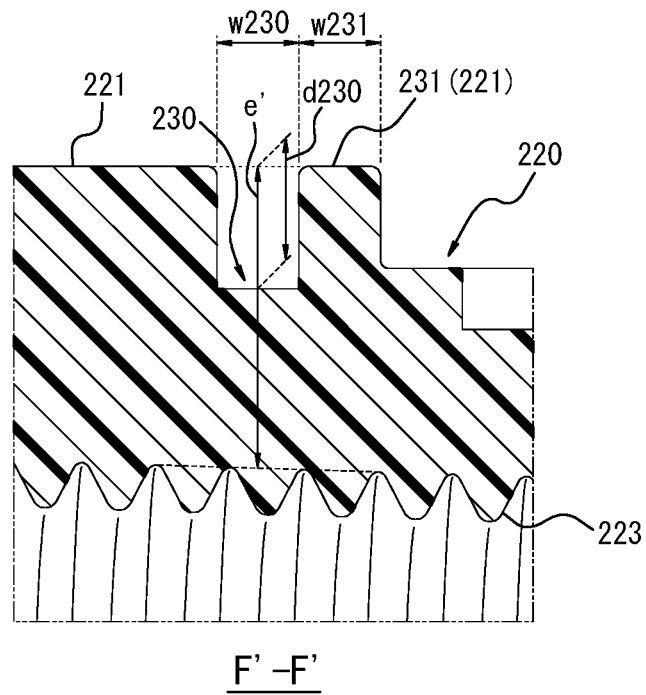
FIG. 15A is a cross-sectional view along the line F'-F' of FIG. 14.
Figure 15B:
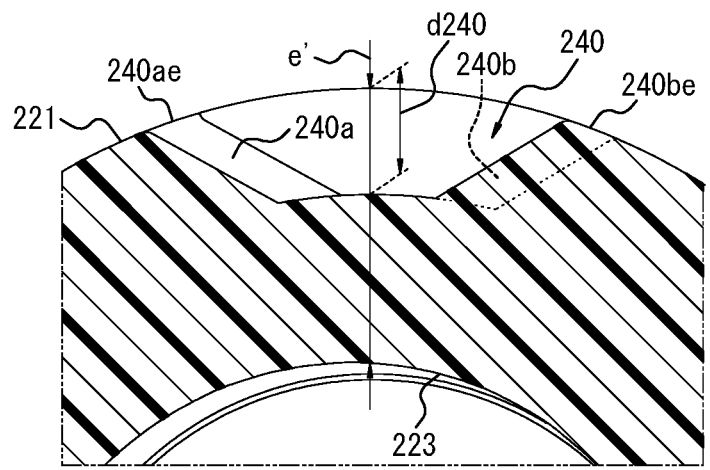
FIG. 15B is a cross-sectional view along the line G'-G' of FIG. 14.

The resin member 200 of the present example is in a similar manner with the above, where for the resin member 200, it is preferable that the depth d230 of the annular groove portion 230 when measured along the radial direction be 25% or more of the thickness e' of the main body MB when measured along the radial direction at the same position where the depth d230 of the annular groove portion 230 is measured, as illustrated in FIG. 15A.

In addition, for the resin member 200 of the present example, it is preferable that the depth d230 of the annular groove portion 230 when measured along the radial direction be 50% or less of the thickness e' of the main body MB when measured along the radial direction at the same position where the depth d230 of the annular groove portion 230 is measured.

The "thickness e' of the main body MB" when measured along the radial direction corresponds to the thickness of the circumferential wall of the cylindrical shape formed by the main body MB. In the case where a female screw 223 is provided on the inner circumferential side of the main body MB as in the present example, it is the length obtained by measuring the distance from a lower end to an upper end, where the lower end is a position on the most outer circumferential side of the female screw 223, and the upper end is a position on the opening end surface of the annular groove portion 230 (the extension surface from the outer circumferential surface of the one-axial-side portion 221 adjacent to the one axial side of the annular groove portion 230).

As illustrated in FIG. 12A, in the mold 100 of the present example, the height h130 of the annular ridge portion 130 when measured along the radial direction is larger than the width w130 of the annular ridge portion 130 when measured along the axial direction. In this way, it is possible to increase the height of the annular ridge portion 130 to effectively exhibit the function of the annular ridge portion 130 of making the resin flow uniform, and at the same time, it is possible to prevent the width of the annular groove portion 230 molded by the annular ridge portion 130 from being wide and to suppress a decrease in strength of the resin member 200.

The resin member 200 of the present example is in a similar manner with the above, where the depth d230 of the annular groove portion 230 when measured along the radial direction at a predetermined position is larger than the width w230 of the annular groove portion 230 when measured along the axial direction, as illustrated in FIG. 15A.

As illustrated in FIGS. 11 and 12A, in the mold 100 of the present example, the annular ridge portion 130 is arranged at a position spaced from the cavity surface 120 for torque input portion on the one axial side, which is the downstream side in the resin flow direction, and an annular groove portion 131 that extends continuously in the circumferential direction and is recessed toward the outside of cavity CV is configured by the cavity surface 121 for the one-axial-side portion between the cavity surface 120 for torque input portion and the annular ridge portion 130. The annular groove portion 131 is configured to mold an annular ridge portion 231 in the resin member 200.

According to this structure, the molten resin injected from the gate G moves along the cavity surface 120 for torque input portion, then once moves to the outer circumferential side at the annular groove portion 131, and then stagnates in front of the annular ridge portion 130, as schematically illustrated in FIG. 12A. In this way, the effect of the annular ridge portion 130 of damming the resin is enhanced as compared with the case without the annular groove portion 131, and as a result, the function of the annular ridge portion 130 of making the resin flow uniform can be effectively exhibited.

The resin member 200 of the present example is in a similar manner with the above, where the annular groove portion 230 is arranged at a position spaced from the torque input portion 220 on the one axial side, which is the downstream side in the resin flow direction, and an annular ridge portion 231 extending continuously in the circumferential direction is configured by the outer circumferential surface of the one-axial-side portion 221 between the torque input portion 220 and the annular groove portion 230, as illustrated in FIGS. 14 and 15A.

As illustrated in FIG. 12A, in the mold 100 of the present example, the width w131 of the annular groove portion 131 measured along the axial direction is preferably less than or equal to the width w130 of the annular ridge portion 130 measured along the axial direction.

In this way, by arranging the annular ridge portion 130 at a position sufficiently close to the torque input portion 220 and the gate G (the other axial side), it is possible to effectively exhibit the function of the annular ridge portion 130 of damming the resin, and to suppress a decrease in strength of the resin member 200 in the vicinity of the one-axial-side end surface 222 where strength is particularly required.

The resin member 200 of the present example is in a similar manner with the above, where the width w231 of the annular ridge portion 231 measured along the axial direction is preferably less than or equal to the width w230 of the annular groove portion 230 measured along the axial direction, as illustrated in FIG. 15A.

As illustrated in FIGS. 11 and 13, the mold 100 of the present example has a small ridge portion 140 (ridge portion) on the cavity surface 121 for one-axial-side portion, where the small ridge portion 140 is not continuous in an annular shape, extends in a direction intersecting the weld extending direction (the axial direction in the present example), and protrudes to the inside of the cavity CV.

In the present example, the small ridge portion 140 extends in the circumferential direction. Note that the small ridge portion 140 may extend in a direction intersecting at a non-right angle with respect to the circumferential direction. The small ridge portion 140 is configured to mold a small groove portion 240 in the resin member 200. The extending direction of the small ridge portion 140 is the extending direction (longitudinal direction) when observing the outer edge shape of the base end surface of the small ridge portion 140. In the illustrated example, three small ridge portions 140 are arranged in a direction intersecting the weld extending direction (more specifically in the circumferential direction in the present example) at intervals from each other, to form a small ridge portion row 182 (ridge portion row).

Figure 12B:
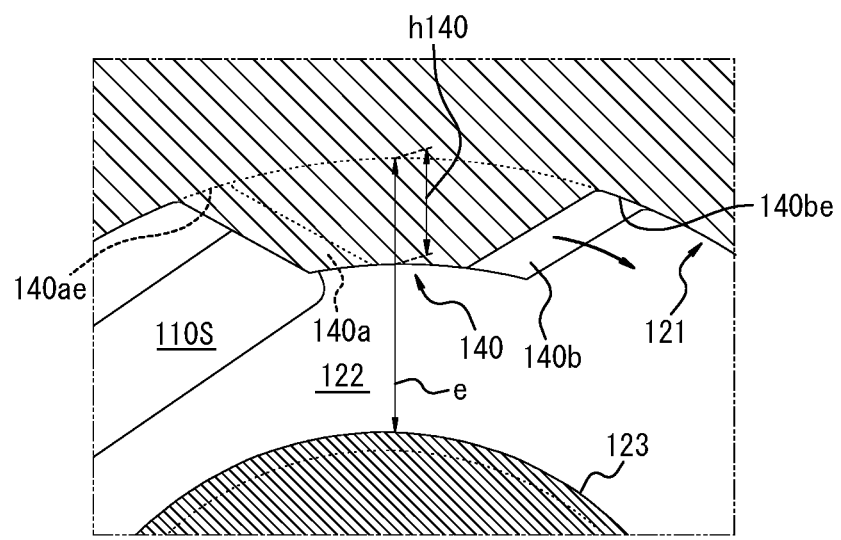
FIG. 12B is a cross-sectional view along the line G-G of FIG. 11.

According to this structure, the molten resin that is injected from the gate G and moves toward the one axial side once stagnates in front of the small ridge portion 140, turns at the end portions in the extending direction of the small ridge portion 140 (the circumferential direction in the present example) so as to go around the small ridge portion 140, and then proceeds from the small ridge portion 140 to the one axial side, as schematically illustrated in FIGS. 11 and 12B. In this way, it is possible to urge the flow of the resin in a weld intersecting direction, that is, in the circumferential direction in the present example, in the region from the small ridge portion 140 to the cavity surface 122 for one-axial-side end surface. As a result, it is possible increase the weld-intersecting-direction component (particularly circumferential-direction component) of the shape of the weld portion W and the weld-intersecting-direction component (particularly circumferential-direction component) of the orientation of the reinforcing fibers F in the vicinity of the between-gate position BGP and in the vicinity of the weld portion W. The strength of the weld portion W thus can be improved. Moreover, the small ridge portion 140 is not continuous in an annular shape, so a decrease in strength of the resin member 200 can be suppressed as compared with the case of the annular ridge portion 130.

The resin member 200 of the present example is in a similar manner with the above. The resin member 200 has a small groove portion 240 (groove portion) on the outer circumferential surface of the one-axial-side portion 221, where the small groove portion 240 is not continuous in an annular shape, and extends in a direction intersecting the weld extending direction (the axial direction in the present example), more specifically, extends in the circumferential direction in the present example, as illustrated in FIG. 14. Note that the small groove portion 240 may extend in a direction intersecting at a non-right angle with respect to the circumferential direction. The extending direction of the small groove portion 240 is the extending direction (longitudinal direction) when observing the outer edge shape of the base end surface of the small groove portion 240. In the illustrated example, three small groove portions 240 are arranged in a direction intersecting the weld extending direction (more specifically the circumferential direction in the present example) at intervals from each other, to form a small groove portion row 282 (groove portion row).

In the mold 100 of FIG. 11, each small ridge portion 140 is arranged in the vicinity of the end portion on the downstream side in the resin flow direction (one axial side) of the cavity CV. The "vicinity of the end portion on the downstream side in the resin flow direction (one axial side) of the cavity CV" refers to a region on the most downstream side in the resin flow direction (one axial side) that extends over a distance of 35% of the axial distance LG between the gate G and the one-axial-side end of the cavity CV (cavity surface 122 for one-axial-side end surface). More specifically, it is preferable that the end edge portion 140ce of each small ridge portion 140 of the present example on the upstream side in the resin flow direction (other axial side) be arranged on the downstream side in the resin flow direction with respect to an axial position ap1, which is a position on the upstream side in the resin flow direction with respect to the end 122 of the cavity CV on the downstream side in the resin flow direction and away from the end 122 only at a distance L1 ($L1=0.23 \times LG$) of 23% of the axial distance LG between the gate G and the one-axial-side end of the cavity CV (cavity surface 122 for one-axial-side end surface). Further, it is preferable that the end edge portion 140ce of each small ridge portion 140 of the present example on the upstream side in the resin flow direction (other axial side) be arranged on the downstream side in the resin flow direction with respect to an axial position ap1, which is a position on the upstream side in the resin flow direction with respect to the end 122 of the cavity CV on the downstream side in the resin flow direction and away from the end 122 only at a distance L1 ($L1=0.37 \times L121$) of 37% of the total length L121 in the axial direction of the cavity surface 121 for one-axial-side portion.

In this way, it is possible to improve the strength of the weld portion W by actively directing the resin flow in a weld intersecting direction (circumferential direction) in the vicinity of the end portion on the downstream side in the resin flow direction (one axial side), which is a region where the weld portion W is particularly easily formed and a region where particularly high strength is required, without significantly deteriorating the strength of the resin member 200.

The resin member 200 of FIG. 14 is in a similar manner with the above, where each small groove portion 240 is arranged in the vicinity of the end portion on the downstream side in the resin flow direction (one axial side) of the main body MB. The "vicinity of the end portion on the downstream side in the resin flow direction (one axial side) of the main body MB" refers to a region on the most downstream side in the resin flow direction (one axial side) that extends over a distance of 35% of the axial distance LG between the gate G and the one-axial-side end of the main body MB (one-axial-side end surface 222). More specifically, it is preferable that the end edge portion 240ce of each small groove portion 240 of the present example on the other axial side be arranged on the downstream side in the resin flow direction with respect to an axial position ap1', which is a position on the upstream side in the resin flow direction with respect to the end 222 of the main body MB on the downstream side in the resin flow direction and away from the end 222 only at a distance L1' ($L1'=0.23 \times LG'$) of 23% of the axial distance LG' between the gate G and the one-axial-side end of the main body MB (one-axial-side end surface 222). Further, it is preferable that the end edge portion 240ce of each small groove portion 240 of the present example on the other axial side be arranged on the downstream side in the resin flow direction with respect to an axial position ap1', which is a position on the upstream side in the resin flow direction with respect to the end of the main body MB on the downstream side in the resin flow direction and away from the end only at a distance L1' ($L1'=0.37 \times L221$) of 37% of the total length L221 in the axial direction of the one axial side portion 221.

In the mold 100 of FIG. 11, the small ridge portion 140 is arranged at a position (circumferential position) that does not overlap with the between-gate position BGP (or the weld portion W), that is, the small ridge portion 140 is distanced from the between-gate position BGP (and the weld portion W) in a direction intersecting the weld extending direction (more specifically, the circumferential direction in the present example). Specifically, the small ridge portion 140 is arranged at a position (circumferential position) overlapping with the gate position GP.

The between-gate position BGP (and the weld portion W) is originally where the strength is most likely to decrease in the resin member 200. Therefore, avoiding arranging the small ridge portion 140 there and avoiding forming the small groove portion 240 there can suppress a decrease in strength of the resin member 200. On the other hand, the gate position GP is originally where the strength is highest in the resin member 200. Therefore, arranging the small ridge portion 140 there and forming the small groove portion 240 there can extremely suppress a decrease in strength of the resin member 200.

The resin member 200 of FIG. 14 is in a similar manner with the above, where the small groove portion 240 is arranged at a position (circumferential position) that does not overlap with the between-gate position BGP (or the weld portion W), that is, the small groove portion 240 is distanced from the between-gate position BGP (and the weld portion W) in a direction intersecting the weld extending direction (more specifically, the circumferential direction in the present example). Specifically, the small groove portion 240 is arranged at a position (circumferential position) overlapping with the gate position GP. In the resin member 200, the gate position GP and the between-gate position BGP can be specified from the trace of the gate G as described above.

At the outer edge of the base end surface of the small ridge portion 140 of the mold 100 in FIG. 11, at least one of the end edge portion 140ae on one side and the end edge portion 140be on the other side (the end edge portions on the two sides in the illustrated example) of the extending direction of the small ridge portion 140 (the circumferential direction in the present example) extends in a direction intersecting at a non-right angle with respect to the weld extending direction (the axial direction in the present example), and extends in a direction intersecting at a non-right angle with respect to the direction perpendicular to the weld extending direction (the circumferential direction in the present example).

According to this structure, when the molten resin once stagnates in front of the small ridge portion 140, turns at the end portions in the extending direction of the small ridge portion 140 (the circumferential direction in the present example) so as to go around the small ridge portion 140, and then proceeds from the small ridge portion 140 to the one axial side as schematically illustrated in FIGS. 11 and 12B, the wall surfaces 140a and 140b on the end sides of the extending direction of the small ridge portion 140 can effectively urge the resin to flow in a direction intersecting the weld extending direction, that is, in the circumferential direction in the present example. As a result, it is possible to increase the weld-intersecting-direction component (circumferential-direction component) of the shape of the weld portion W and the weld-intersecting-direction component (circumferential-direction component) of the orientation of the reinforcing fibers F in the vicinity of the between-gate position BGP and in the vicinity of the weld portion W. The strength of the weld portion W thus can be improved.

The resin member 200 of FIG. 14 is in a similar manner with the above, where, at the outer edge of the opening end surface of the small groove portion 240, at least one of the end edge portion 240ae on one side and the end edge portion 240be on the other side (the end edge portions on the two sides in the illustrated example) of the extending direction of the small groove portion 240 (the circumferential direction in the present example) extends in a direction intersecting at a non-right angle with respect to the weld extending direction (the axial direction in the present example), and extends in a direction intersecting at a non-right angle with respect to the direction perpendicular to the weld extending direction (the circumferential direction in the present example).

In the mold 100 of FIG. 11, the outer edge of the base end surface of the small ridge portion 140 is in a parallelogram shape. At the outer edge of the base end surface of the small ridge portion 140, the end edge portions 140ae and 140be on the two side in the extending direction of the small ridge portion 140 (the circumferential direction in the present example) each extend in a straight line toward the same side in the direction perpendicular to the weld extending direction (the circumferential direction in the present example) as they go toward one side in the weld extending direction (the axial direction in the present example).

According to this structure, it is possible to effectively urge the resin flow to circulate to the same side in a weld intersecting direction, that is, the same side in the circumferential direction in the present example, on the one axial side of the small ridge portion 140.

The resin member 200 of FIG. 14 is in a similar manner with the above, where the outer edge of the opening end surface of the small groove portion 240 is in a parallelogram shape. At the outer edge of the opening end surface of the small groove portion 240, the end edge portions 240ae and 240be on the two side in the extending direction of the small groove portion 240 (the circumferential direction in the present example) each extend in a straight line toward the same side in the direction perpendicular to the weld extending direction (the circumferential direction in the present example) as they go toward one side in the weld extending direction (the axial direction in the present example).

As illustrated in FIGS. 12B and 13, in the mold 100 of the present example, at least one of the wall surface 140a on one side and the wall surface 140b on the other side (the wall surfaces on the two sides in the illustrated example) in the extending direction of the small ridge portion 140 (the circumferential direction in the present example) extends continuously or stepwise toward the base end surface of the small ridge portion 140 (that is, extends so that the height of the small ridge portion 140 decreases) as they go toward respective corresponding sides in the extending direction of the small ridge portion 140. More specifically, in the present example, at least one of the wall surface 140a on one side and the wall surface 140b on the other side (the wall surfaces on the two sides in the illustrated example) in the extending direction of the small ridge portion 140 (the circumferential direction in the present example) extends (inclines) continuously and straight toward the base end surface of the small ridge portion 140 (that is, extends (inclines) so that the height of the small ridge portion 140 decreases) as they go toward respective corresponding sides in the extending direction of the small ridge portion 140. That is, the small ridge portion 140 is configured in a tapered shape.

According to this structure, it is possible to more effectively exhibit the function of the small ridge portion 140 of urging the resin to flow to the same side in a weld intersecting direction, that is, the same side in the circumferential direction in the present example, further increase the strength of the resin member 200 as a molded article, and make it easier to remove the small ridge portion 140 of the mold 100 from the small groove portion 240 of the resin member 200 during mold release, as compared with the case, for example, where the wall surfaces 140a and 140b on the two sides in the extending direction of the small ridge portion 140 (the circumferential direction in the present example) are perpendicular to the base end surface of the small ridge portion 140.

The resin member 200 of FIG. 14 is in a similar manner with the above, where at least one of the wall surface 240a on one side and the wall surface 240b on the other side (the wall surfaces on the two sides in the illustrated example) in the extending direction of the small groove portion 240 (the circumferential direction in the present example) extends continuously or stepwise toward the opening end surface of the small groove portion 240 (that is, extends so that the depth of the small groove portion 240 decreases) as they go toward respective corresponding sides in the extending direction of the small groove portion 240. More specifically, in the present example, at least one of the wall surface 240a on one side and the wall surface 240b on the other side (the wall surfaces on the two sides in the illustrated example) in the extending direction of the small groove portion 240 (the circumferential direction in the present example) extends (inclines) continuously and straight toward the opening end surface of the small groove portion 240 (that is, extends (inclines) so that the depth of the small groove portion 240 decreases) as they go toward respective corresponding sides in the extending direction of the small groove portion 240. That is, the small groove portion 240 is configured in a tapered shape.

As illustrated in FIG. 12B, for the mold 100 of the present example, it is preferable that the height h140 of the small ridge portion 140, which is measured along the direction perpendicular to the base end surface of the small ridge portion 140 (radial direction) at a position where the height of the small ridge portion 140 is maximum, be 25% or more of the thickness e of the cavity CV when measured along the direction perpendicular to the base end surface of the small ridge portion 140 (radial direction) at that position. In this way, it is possible to provide the small ridge portion 140 with a sufficient height and to effectively exhibit the function of the small ridge portion 140 of guiding the resin flow.

In addition, for the mold 100 of the present example, it is preferable that the height h140 of the small ridge portion 140, which is measured along the direction perpendicular to the base end surface of the small ridge portion 140 (radial direction) at a position where the height of the small ridge portion 140 is maximum, be 50% or less of the thickness e of the cavity CV when measured along the direction perpendicular to the base end surface of the small ridge portion 140 (radial direction) at that position. In this way, it is possible to prevent the depth of the small groove portion 240 molded by the small ridge portion 140 from being deep, and to suppress a decrease in strength of the resin member 200.

The resin member 200 of the present example is in a similar manner with the above, where it is preferable that the depth d240 of the small groove portion 240, which is measured along the direction perpendicular to the opening end surface of the small groove portion 240 (radial direction) at a position where the depth of the small groove portion 240 is maximum, be 25% or more of the thickness e' of the main body MB when measured along the direction perpendicular to the opening end surface of the small groove portion 240 (radial direction) at that position, as illustrated in FIG. 15B.

In addition, for the resin member 200 of the present example, it is preferable that the depth d240 of the small groove portion 240, which is measured along the direction perpendicular to the opening end surface of the small groove portion 240 (radial direction) at a position where the depth of the small groove portion 240 is maximum, be 50% or less of the thickness e' of the main body MB when measured along the direction perpendicular to the opening end surface of the small groove portion 240 (radial direction) at that position.

Note that the mold 100 is not limited to the example of FIG. 11, and may have an arbitrary number (one or a plurality) of each of the annular ridge portion 130 and the small ridge portion 140 at an arbitrary position in the cavity surface 121 for one-axial-side portion. In addition, the mold 100 may only have either the annular ridge portion 130 or the small ridge portion 140. Further, the mold 100 may have two or more annular ridge portions 130, but it is better to have only one annular ridge portion 130 from the viewpoint of guaranteeing the strength of the resin member 200 as a molded article.

The resin member 200 is in a similar manner with the above, where the resin member 200 is not limited to the example of FIG. 14, and may have an arbitrary number (one or a plurality) of each of the annular groove portion 230 and the small groove portion 240 at an arbitrary position in the outer circumferential surface of the one-axial-side portion 221. In addition, the resin member 200 may only have either the annular groove portion 230 or the small groove portion 240. Further, the resin member 200 may have two or more annular groove portions 230, but it is better to have only one annular groove portion 230.

Embodiment 4

Figure 16:
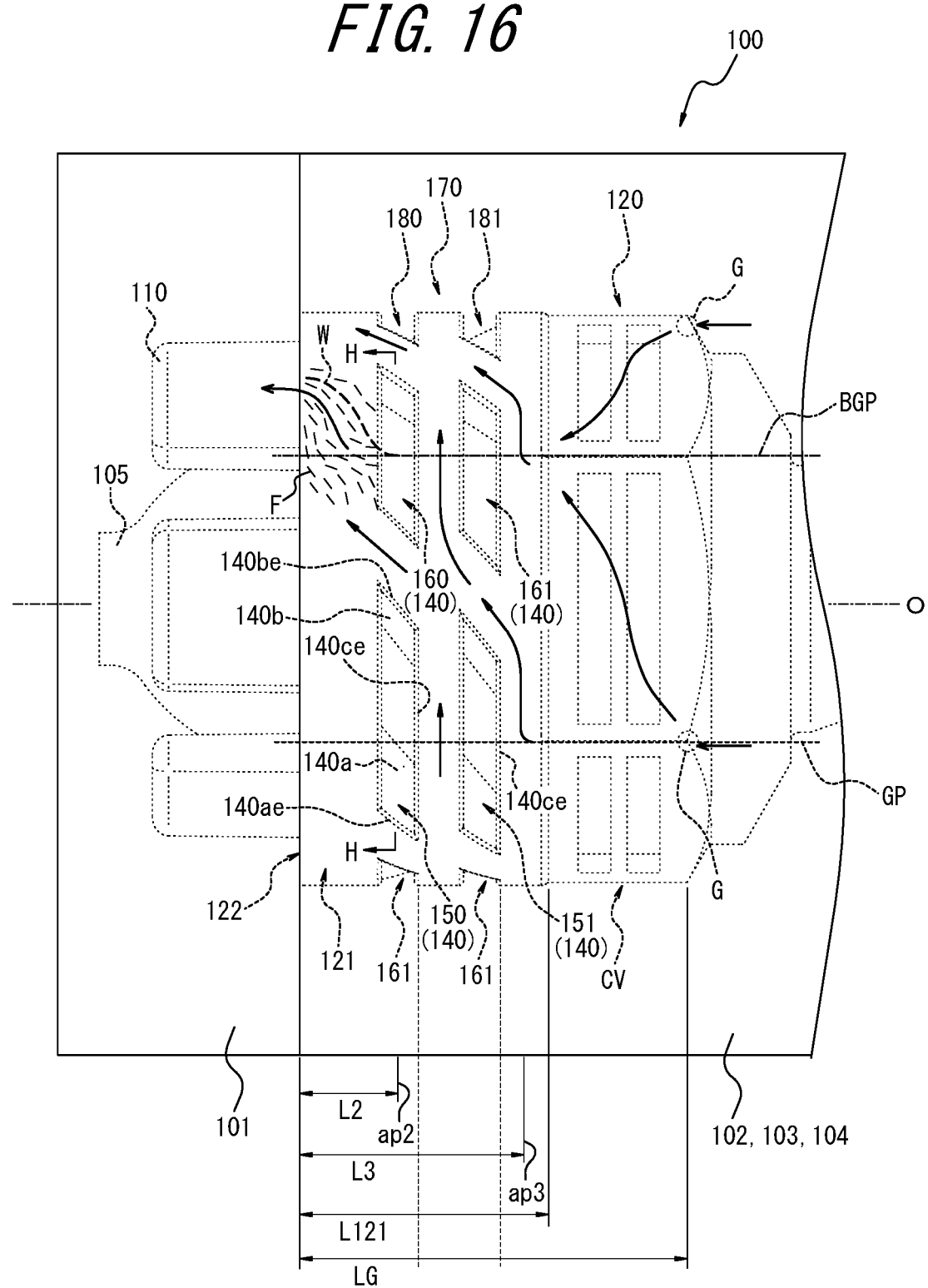
FIG. 16 is an enlarged side view illustrating a main part of the injection mold of Embodiment 4 of the present disclosure, and is a view explaining the working of Embodiment 4 of the present disclosure.
Figure 17:
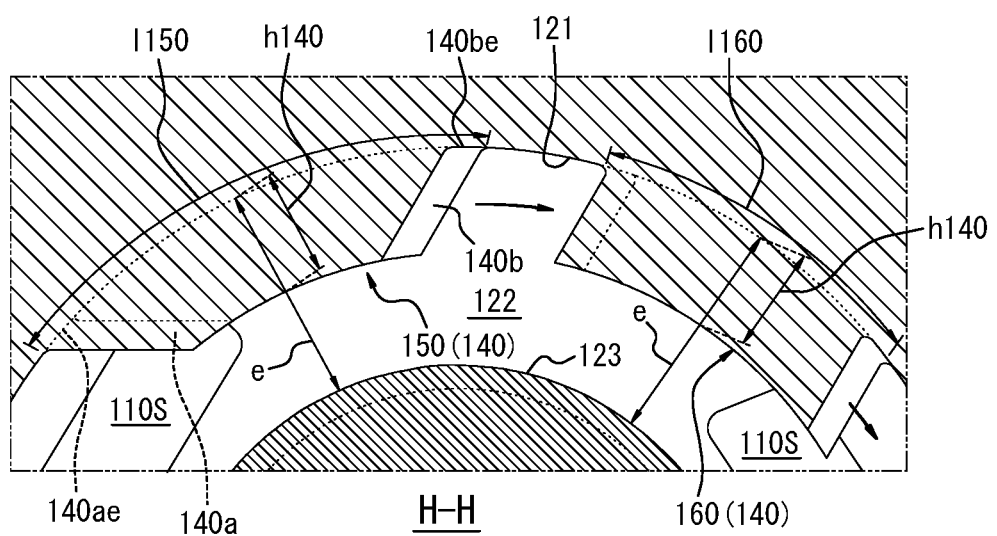
FIG. 17 is a cross-sectional view along the line H-H of FIG. 16.
Figure 18:
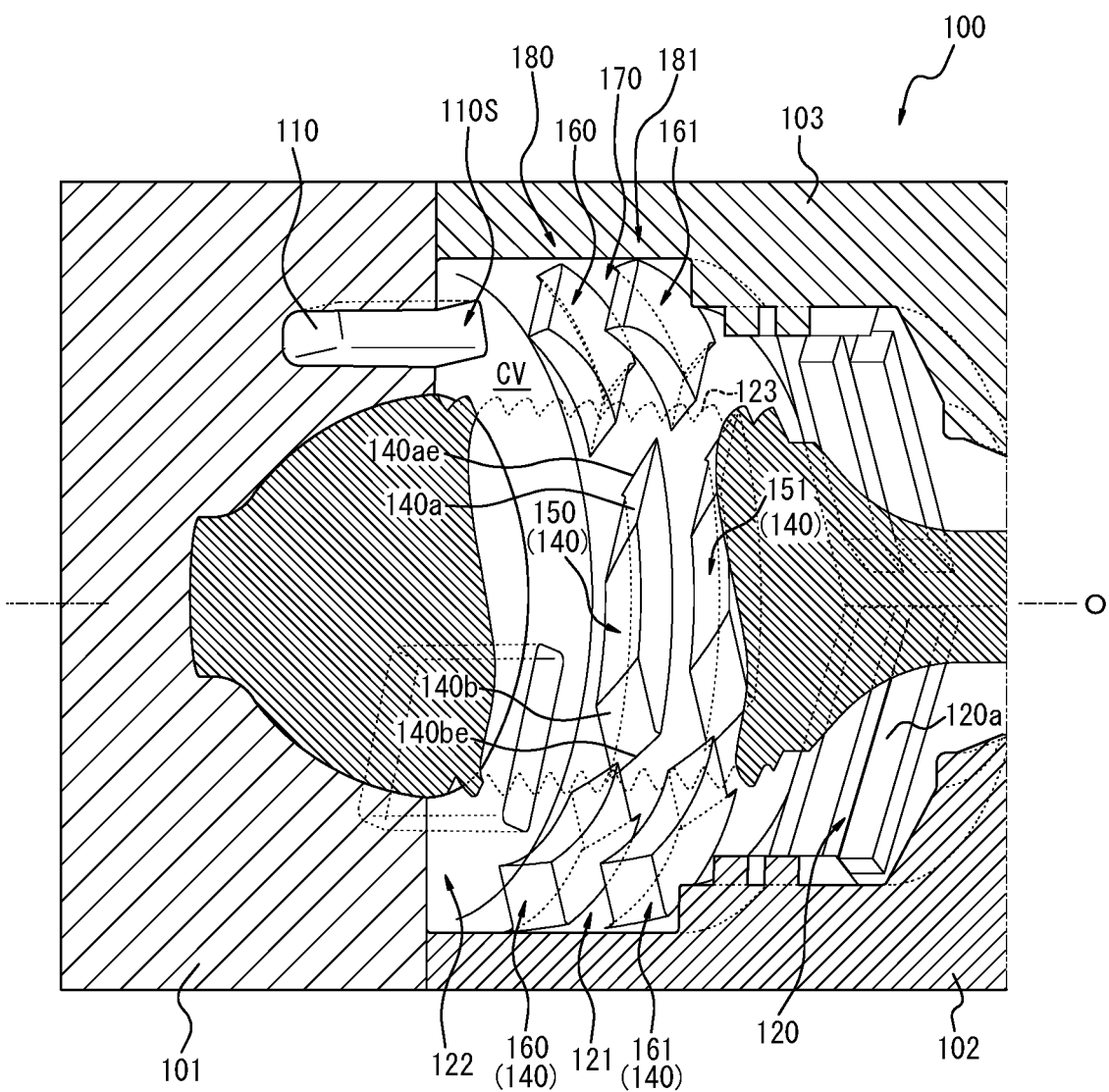
FIG. 18 is a partial cross-sectional perspective view, which illustrates the main part of the injection mold of FIG. 16 in a partial cross-sectional view in the axial direction and in a perspective view.
Figure 19:
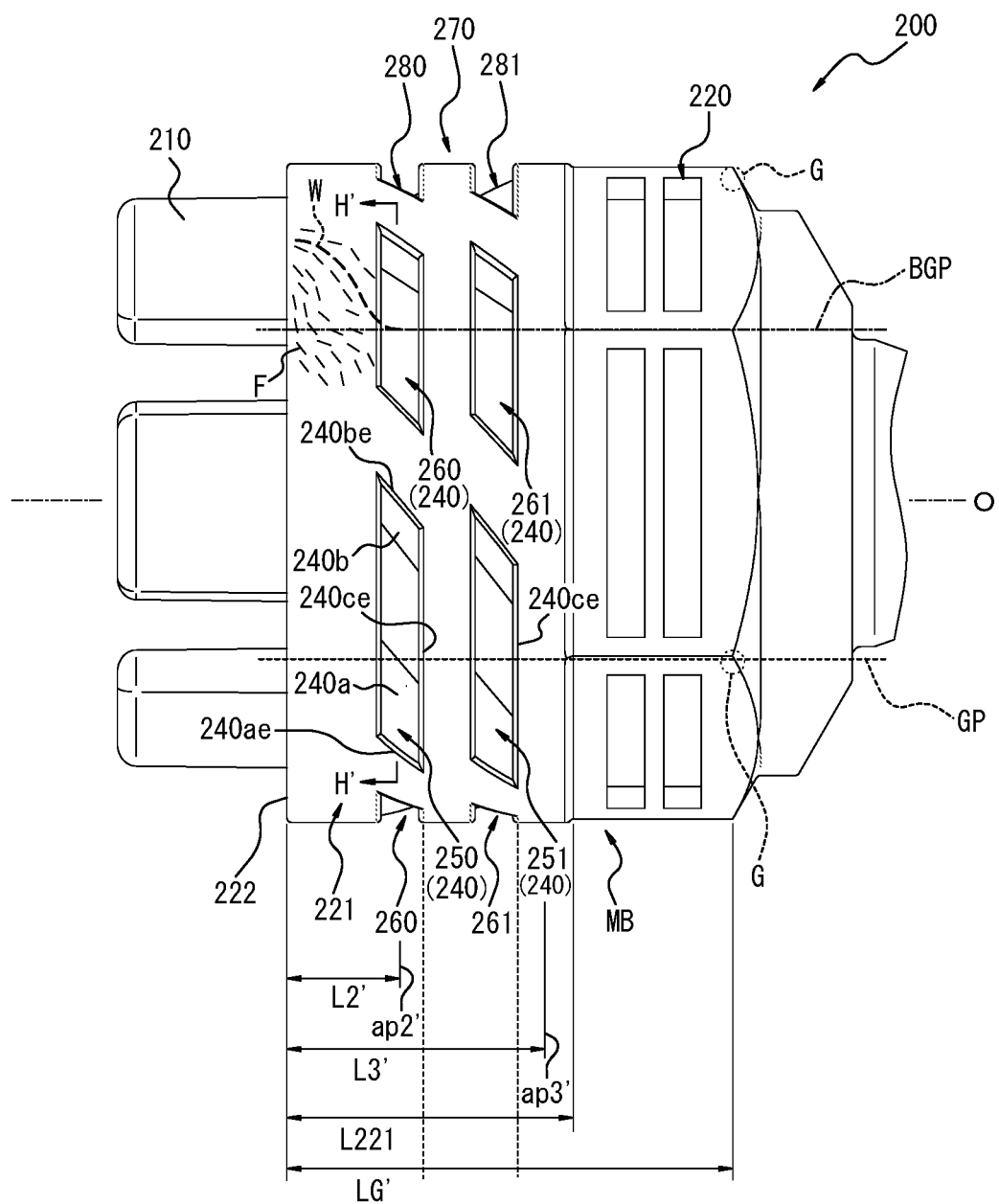
FIG. 19 is an enlarged side view illustrating a main part of the resin member of Embodiment 4 of the present disclosure.
Figure 20:
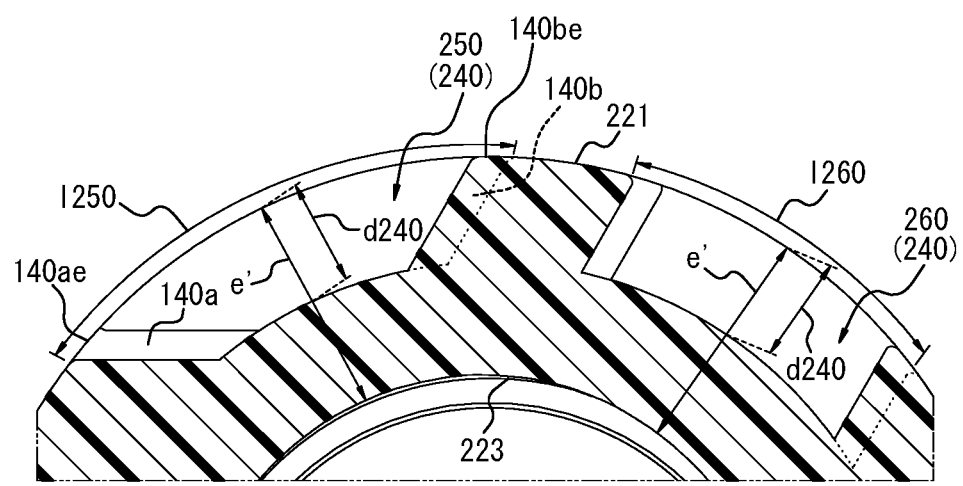
FIG. 20 is a cross-sectional view along the line H'-H' of FIG. 19.

Embodiment 4 of the present disclosure will be described with a focus on the differences from Embodiment 3 with reference to FIGS. 16 to 20. FIGS. 16 to 18 illustrate a mold 100 of the present embodiment. FIGS. 19 and 20 illustrate a resin member 200 of the present embodiment.

Embodiment 4 is different from Embodiment 3 only in the structure of the cavity surface 121 for the one-axial-side portion of the mold 100 and the structure of the one-axial-side portion 221 of the resin member 200. The structure of the resin reservoir 110 of the mold 100 and the structure of the projection 210 of the resin member 200 are the same as that of Embodiment 1.

As illustrated in FIGS. 16 and 18, the mold 100 of the present example is in a similar manner with that of Embodiment 3 (FIG. 11), where a plurality of small ridge portions 140 (small ridge portions 150, 151, 160 and 161) are provided on the cavity surface 121 for one-axial-side portion. In the following description, the small ridge portions 150, 151, 160 and 161 are each referred to as the "small ridge portion 140" when they are not distinguished from each other. Each small ridge portion 140 is not continuous in an annular shape, and extends in a direction intersecting the weld extending direction (the axial direction in the present example), more specifically in the circumferential direction in the present example. Note that the small ridge portions 140 may each extend in a direction intersecting at a non-right angle with respect to the circumferential direction. The small ridge portions 140 (small ridge portions 150, 151, 160 and 161) are configured to mold small groove portions 240 (small groove portions 250, 251, 260 and 261) in the resin member 200. The extending direction of the small ridge portion 140 is the extending direction (longitudinal direction) when observing the outer edge shape of the base end surface of the small ridge portion 140.

In the mold 100 of the present example, the plurality of small ridge portions 140 are arranged at intervals from each other in a direction intersecting the weld extending direction, and are arranged at intervals from each other in the weld extending direction. Specifically, the mold 100 has a small ridge portion row 181 composed of a plurality of (six in the illustrated example) small ridge portions 151 and 161 arranged at intervals from each other in a direction intersecting the weld extending direction (the circumferential direction in the present example), and a small ridge portion row 180 composed of a plurality of (six in the illustrated example) small ridge portions 150 and 160 arranged on the one axial side, which is the downstream side in the resin flow direction, with respect to the small ridge portion row 181, and arranged at intervals from each other in a direction intersecting the weld extending direction (the circumferential direction in the present example). Further, an annular groove portion 170 extending continuously in the circumferential direction is configured by the cavity surface 121 for one-axial-side portion between the small ridge portion rows 180 and 181. The annular groove portion 170 is recessed to the outside of the cavity CV, and is configured to mold an annular ridge portion 270 in the resin member 200.

According to this structure, the molten resin that is injected from the gate G and moves toward the one axial side once stagnates in front of the small ridge portions 151 and 161 of the small ridge portion row 181 on the upstream side, turns at the end portions in the extending direction of the small ridge portions 151 and 161 (the circumferential direction in the present example) so as to go around them, and then proceeds from the small ridge portions 151 and 161 to the one axial side, as schematically illustrated in FIG. 16. Subsequently, the resin once stagnates in front of the small ridge portions 150 and 160 of the small ridge portion row 180 on the downstream side, passes through the annular groove portion 170 so as to go around them, and then turns at the end portions in the extending direction of the small ridge portions 150 and 160 (the circumferential direction in the present example) and proceeds to the one axial side. This urges the molten resin to flow in a direction intersecting the weld extending direction (the circumferential direction in the present example) when the molten resin passes beside the end portions in the extending direction of each small ridge portion 140 or when the molten resin passes through the annular groove portion 170. As a result, it is possible to increase the weld-intersecting-direction component (circumferential-direction component) of the shape of the weld portion W and the weld-intersecting-direction component (circumferential-direction component) of the orientation of the reinforcing fibers F in the vicinity of the between-gate position BGP and in the vicinity of the weld portion W. The strength of the weld portion W thus can be improved. In addition, the small ridge portions 151 and 161 of the upstream small ridge portion row 181, and the small ridge portions 150 and 160 of the downstream small ridge portion row 180, are not connected with each other. Therefore, a decrease in strength of the resin member 200 as a molded article can be suppressed as compared with the case where two annular ridge portions 130 (FIG. 11) are provided, for example. In addition, an annular groove portion 170 used to mold an annular ridge portion 270 is provided between the small ridge portion rows 180 and 181, so that the strength of the resin member 200 as a molded article can be improved accordingly.

The resin member 200 of the present example is in a similar manner with the above and with that of Embodiment 3 (FIG. 14), where a plurality of small groove portions 240 (small groove portions 250, 251, 260 and 261) are provided on the outer circumferential surface of the one-axial-side portion 221, as illustrated in FIG. 19. In the following description, the small groove portions 250, 251, 260 and 261 are each referred to as the "small groove portion 240" when they are not distinguished from each other. Each small groove portion 240 is not continuous in an annular shape, and extends in a direction intersecting the weld extending direction (the axial direction in the present example), more specifically in the circumferential direction in the present example. Note that the small groove portion 240 may each extend in a direction intersecting at a non-right angle with respect to the circumferential direction. The extending direction of the small groove portion 240 is the extending direction (longitudinal direction) when observing the outer edge shape of the opening end surface of the small groove portion 240.

In the resin member 200 of the present example, the plurality of small groove portions 240 are arranged at intervals from each other in a direction intersecting the weld extending direction, and are arranged at intervals from each other in the weld extending direction. Specifically, the resin member 200 has a small groove portion row 281 composed of a plurality of (six in the illustrated example) small groove portions 251 and 261 arranged at intervals from each other in a direction intersecting the weld extending direction (the circumferential direction in the present example), and a small groove portion row 280 composed of a plurality of (six in the illustrated example) small groove portions 250 and 260 arranged on the one axial side, which is the downstream side in the resin flow direction, with respect to the small groove portion row 281, and arranged at intervals from each other in a direction intersecting the weld extending direction (the circumferential direction in the present example). Further, an annular ridge portion 270 extending continuously in the circumferential direction is configured by the outer circumferential surface of the one-axial-side portion 221 between the small groove portion rows 280 and 281.

In the mold 100 of FIG. 16, a pair of small ridge portions 150 and 151 and a pair of small ridge portions 160 and 161 adjacent to each other in the weld extending direction (the axial direction in the present example) are arranged so as to be shifted in the direction perpendicular to the weld extending direction (the circumferential direction in the present example) even if they overlap in the weld extending direction.

According to this structure, it is possible to dam the molten resin, which has passed the small ridge portion row 181 on the upstream side, more effectively by the small ridge portions 150 and 160 of the small ridge portion row 180 on the downstream side, prevent the molten resin from directly passing the small ridge portion row 180 on the downstream side, and urge the molten resin to pass along the annular groove portion 170. As a result, it is possible to increase the weld-intersecting-direction component (circumferential-direction component) of the shape of the weld portion W and the weld-intersecting-direction component (circumferential-direction component) of the orientation of the reinforcing fibers F in the vicinity of the between-gate position BGP and in the vicinity of the weld portion W. The strength of the weld portion W thus can be improved.

The resin member 200 of the present example is in a similar manner with the above, where a pair of small groove portions 250 and 251 and a pair of small groove portions 260 and 261 adjacent to each other in the weld extending direction (the axial direction in the present example) are arranged so as to be shifted in the direction perpendicular to the weld extending direction (the circumferential direction in the present example) even if they overlap in the weld extending direction, as illustrated in FIG. 19.

As illustrated in FIG. 16 and FIG. 18, in the mold 100 of the present example, each small ridge portion 140 is in a similar manner with that of Embodiment 3 (FIG. 11), where the outer edge of the base end surface is formed in a parallelogram shape. At the outer edge of the base end surface of the small ridge portion 140, the end edge portions 140*ae* and 140*be* on the two sides of the extending direction of the small ridge portion 140 (the circumferential direction in the present example) each extend (incline) toward the same side (first side) in the direction perpendicular to the weld extending direction (the circumferential direction in the present example) as they go toward one side in the weld extending direction (the axial direction in the present example). In other words, for each of the end edge portions 140ae and 140be on the two sides of the extending direction of each small ridge portion 140 on the outer edge of the base end surface of the small ridge portion 140, the part on one side in the weld extending direction (the part on the downstream side) extends (inclines) toward the same side (first side) in the direction perpendicular to the weld extending direction (the circumferential direction in the present example) with respect to the part on the other side in the respective weld extending direction (the part on the upstream side).

According to this structure, when the molten resin passes beside the end portions in the extending direction of the small ridge portion 140 (the circumferential direction in the present example) and proceeds from the small ridge portion 140 to the one axial side, the wall surfaces 140a and 140b on the end sides in the extending direction of the small ridge portion 140 can effectively urge the resin to flow in a direction intersecting the weld extending direction, that is, in the circumferential direction in the present example. As a result, it is possible to increase the weld-intersecting-direction component (circumferential-direction component) of the shape of the weld portion W and the weld-intersecting-direction component (circumferential-direction component) of the orientation of the reinforcing fibers F in the vicinity of the between-gate position BGP and in the vicinity of the weld portion W. The strength of the weld portion W thus can be improved.

The resin member 200 of FIG. 19 is in a similar manner with the above, where the outer edge of the opening end surface of each small groove portion 240 is formed in a parallelogram shape, as in Embodiment 3 (FIG. 14). At the outer edge of the opening end surface of the small groove portion 240, the end edge portions 240ae and 240be on the two sides in the extending direction of the small groove portion 240 (the circumferential direction in the present example) each extend (incline) toward the same side (first side) in the direction perpendicular to the weld extending direction (the circumferential direction in the present example) as they go toward one side in the weld extending direction (the axial direction in the present example). In other words, for each of the end edge portions 240ae and 240be on the two sides in the extending direction of each small groove portion 240 (the circumferential direction in the present example) on the outer edge of the opening end surface of the small groove portion 240, the part on one side in the weld extending direction (the part on the downstream side) extends (inclines) toward the same side (first side) in the direction perpendicular to the weld extending direction (the circumferential direction in the present example) with respect to the part on the other side in the respective weld extending direction (the part on the upstream side).

In the mold 100 of FIG. 16, when observing the pair of small ridge portions 150 and 151 and the pair of small ridge portions 160 and 161 adjacent to each other in the weld extending direction (the axial direction in the present example), the small ridge portions 150 and 160 on one side (downstream side, one axial side) in the weld extending direction are shifted from the small ridge portions 151 and 161 on the other side (upstream side, other axial side) in the weld extending direction, so as to be on the same side (first side) of the two sides in the direction perpendicular to the weld extending direction (the circumferential direction in the present example) as the side toward which the part on one side in the weld extending direction (the part on the downstream side) of the end edge portions 140ae and 140be on the two sides in the extending direction of the small ridge portion 140 (the circumferential direction in the present example) at the outer edge of the base end surface of each small ridge portion 140 is inclined with respect to the part on the other side in the respective weld extending direction (the part on the upstream side).

According to this structure, it is possible to more effectively exhibit the function of the small ridge portions 150, 160 of the small ridge portion row 180 on the downstream side of damming the molten resin that has passed the small ridge portion row 181 on the upstream side and urging the resin to pass along the annular groove portion 170.

The resin member 200 of FIG. 19 is in a similar manner with the above, where, when observing the pair of small groove portions 250 and 251 and the pair of small groove portions 260 and 261 adjacent to each other in the weld extending direction (the axial direction in the present example), the small groove portions 250 and 260 on one side (downstream side, one axial side) in the weld extending direction are shifted from the small groove portions 251 and 261 on the other side (upstream side, other axial side) in the weld extending direction, so as to be on the same side (first side) of the two sides in the direction perpendicular to the weld extending direction (the circumferential direction in the present example) as the side toward which the part on one side in the weld extending direction (the part on the downstream side) of the end edge portions 240ae and 240be on the two sides in the extending direction of the small groove portion 240 (the circumferential direction in the present example) at the outer edge of the opening end surface of each small groove portion 240 is inclined with respect the part on the other side in the respective weld extending direction (the part on the upstream side).

As illustrated in FIG. 16 and FIG. 17, in the mold 100 of the present example, the extension length (the length in the circumferential direction in the present example) of each small ridge portion 140 is non-uniform. More specifically, the small ridge portion row 180 includes a plurality of types (two types in the illustrated example) of small ridge portions 150 and 160 with different extension lengths (lengths in the circumferential direction in the present example) 1150 and 1160, among which the longest small ridge portion 150 is arranged at a position (circumferential position) overlapping with the gate position GP, and the shorter small ridge portion 160 is arranged at a position (circumferential position) not overlapping with the gate position GP. More specifically, in the present example, the shortest small ridge portion 160 is arranged at a position (circumferential position) overlapping with the between-gate position BGP (and the weld portion W). The same applies to the small ridge portion row 181 and the description thereof is omitted.

The gate position GP is originally where the strength is highest in the resin member 200. Therefore, arranging the longest small ridge portion 150 there and thereby forming a relatively long small groove portion 250 there can extremely suppress a decrease in strength of the resin member 200. On the other hand, the between-gate position BGP (and the weld portion W) is originally where the strength is most likely to decrease in the resin member 200. Therefore, arranging a relatively short small ridge portion 160 there and thereby forming a relatively short small groove portion 260 there can suppress a decrease in strength of the resin member 200.

The resin member 200 of FIG. 19 is in a similar manner with the above, where the extension length (the length in the circumferential direction in the present example) of each small groove portion 240 is non-uniform. More specifically, the small groove portion row 280 includes a plurality of types (two types in the illustrated example) of small groove portions 250 and 260 with different extension lengths (lengths in the circumferential direction in the present example), among which the longest small groove portion 250 is arranged at a position (circumferential position) overlapping with the gate position GP, and the shorter small groove portion 260 is arranged at a position (circumferential position) not overlapping with the gate position GP. More specifically, in the present example, the shortest small groove portion 260 is arranged at a position (circumferential position) overlapping with the between-gate position BGP (and the weld portion W). The same applies to the small groove portion row 281 and the description thereof is omitted.

As illustrated in FIG. 17, for the small ridge portions 150 and 160 in the small ridge portion row 180 in the mold 100 of the present example, the small ridge portion 150 arranged at a position (circumferential position) overlapping with the gate position GP, that is, the longest small ridge portion 150 in the present example, is in a similar manner with the small ridge portion 140 of Embodiment 3, where at least one of the wall surface 140a on one side and the wall surface 140b on the other side (the wall surfaces on the two sides in the illustrated example) in the extending direction of the small ridge portion 150 (the circumferential direction in the present example) extends continuously or stepwise toward the base end surface of the small ridge portion 150 (that is, extends so that the height of the small ridge portion 150 decreases) as they go toward respective corresponding sides in the extending direction of the small ridge portion 150. More specifically, in the present example, at least one of the wall surface 140a on one side and the wall surface 140b on the other side (the wall surfaces on the two sides in the illustrated example) in the extending direction of the small ridge portion 150 (the circumferential direction in the present example) extends (inclines) continuously and straight toward the base end surface of the small ridge portion 150 (that is, extends (inclines) so that the height of the small ridge portion 150 decreases) as they go toward respective corresponding sides in the extending direction of the small ridge portion 150. That is, the small ridge portion 150 is configured in a tapered shape. In the illustrated example, the small ridge portion 160 arranged at a position (circumferential position) overlapping with the between-gate position BGP (and the weld portion W), that is, the shorter small ridge portion 160 in the present example, is not configured in this way, but it may be configured in this way. Further, for the small ridge portion 160 arranged at a position (circumferential position) overlapping with the between-gate position BGP (and the weld portion W) in the illustrated example, at least one of the wall surface 140a on one side and the wall surface 140b on the other side (the wall surfaces on the two sides in the illustrated example) in the extending direction of the small ridge portion 160 (the circumferential direction in the present example) extends continuously or stepwise toward the base end surface of the small ridge portion 160 as they go toward the center side in the extending direction of the small ridge portion 160.

According to this structure, it is possible to more effectively exhibit the function of the small ridge portion 140 of urging the resin to flow to the same side in a direction intersecting the weld intersecting direction, that is, the same side in the circumferential direction in the present example, further increase the strength of the resin member 200 as a molded article, and make it easier to remove the small ridge portion 150 of the mold 100 from the small groove portion 240 of the resin member 200 during mold release, as compared with the case, for example, where the wall surfaces 140a and 140b on the two sides in the extending direction of the small ridge portion 150 (the circumferential direction in the present example) are perpendicular to the base end surface of the small ridge portion 150. In particular, the longest small ridge portion 150 is more likely to decrease the strength of the resin member 200 than the short small ridge portion 160, and therefore this structure can suppress a decrease in strength of the resin member 200.

As illustrated in FIG. 20, the resin member 200 of the present example is in a similar manner with the above. In the small groove portions 250 and 260 of the small groove portion row 280, the small groove portion 250 arranged at a position (circumferential position) overlapping with the gate position GP, that is, the longest small groove portion 250 in the present example, is in a similar manner with the small groove portion 240 of Embodiment 3, where at least one of the wall surface 240a on one side and the wall surface 240b on the other side (the wall surfaces on the two sides in the illustrated example) in the extending direction of the small groove portion 250 (the circumferential direction in the present example) extends continuously or stepwise toward the opening end surface of the small groove portion 250 (that is, extends so that the depth of the small groove portion 250 decreases) as they go toward respective corresponding sides in the extending direction of the small groove portion 250. More specifically, in the present example, at least one of the wall surface 240a on one side and the wall surface 240b on the other side (the wall surfaces on the two sides in the illustrated example) in the extending direction of the small groove portion 250 (the circumferential direction in the present example) extends (inclines) continuously and straight toward the opening end surface of the small groove portion 250 (that is, extends (inclines) so that the depth of the small groove portion 250 decreases) as they go toward respective corresponding sides in the extending direction of the small groove portion 250. That is, the small groove portion 250 is configured in a tapered shape. In the illustrated example, the small groove portion 260 arranged at a position (circumferential position) overlapping with the between-gate position BGP (and the weld portion W), that is, the shorter small groove portion 260 in the present example, is not configured in this way, but it may be configured in this way. In addition, for the small groove portion 260 arranged at a position (circumferential position) overlapping with the between-gate position BGP (and the weld portion W) in the illustrated example, at least one of the wall surface 240a on one side and the wall surface 240b on the other side (the wall surfaces on the two sides in the illustrated example) in the extending direction of the small groove portion 260 (the circumferential direction in the present example) extends continuously or stepwise toward the opening end surface of the small groove portion 260 as they go toward the center side in the extending direction of the small groove portion 260.

In the mold 100 of FIG. 16, each small ridge portion 140 is arranged on the downstream side in the resin flow direction (one axial side) of the cavity CV. The "the downstream side in the resin flow direction (one axial side) of the cavity CV" refers to the most downstream region in the resin flow direction in the cavity CV, where the region extends over a distance of 65% of the distance LG in the resin flow direction (the distance along the axial direction in the present example) between the gate G and the end of the cavity CV on the downstream side in the resin flow direction (the one-axial-side end, that is, the cavity surface 122 for one-axial-side end surface in the present example).

In this way, the small ridge portion 140 is provided in a region that is relatively far from the gate G and thus is easy to form a weld portion W as compared with the case where each small ridge portion 140 is arranged on the upstream side in the resin flow direction (other axial side) of the cavity CV. As a result, the resin flow in the vicinity of the weld portion W is actively directed in a weld intersecting direction (circumferential direction), and the strength of the weld portion W thus can be improved.

The resin member 200 of FIG. 19 is in a similar manner with the above, where each small groove portion 240 is arranged on the downstream side in the resin flow direction (one axial side) of the main body MB. The "downstream side in the resin flow direction (one axial side) of the main body MB" refers to the most downstream region in the resin flow direction in the main body MB, where the region extends over a distance of 65% of the distance LG' in the resin flow direction (the distance along the axial direction in the present example) between the gate G and the end of the main body MB on the downstream side in the resin flow direction (the one-axial-side end, the one-axial-side end surface 222 in the present example).

In the mold 100 of FIG. 16, each small ridge portion 140 is preferably arranged on the downstream side in the resin flow direction (one axial side) inside the cavity CV and on the upstream side with respect to the end portion of the cavity CV on the downstream side in the resin flow direction. More specifically, it is more preferable that each end edge portion 140ce on the other axial side of each small ridge portion 140 of the present example be arranged between an axial position ap2, which is a position on the upstream side in the resin flow direction with respect to the end 122 of the cavity CV on the downstream side in the resin flow direction and away from the end 122 only at a distance L2 (L2=0.25×LG) of 25% of the axial distance LG between the gate G and the one-axial-side end of the cavity CV (cavity surface 122 for one-axial-side end surface), and an axial position ap3, which is a position on the upstream side in the resin flow direction with respect to the end 122 of the cavity CV on the downstream side in the resin flow direction and away from the end 122 only at a distance L3 (L3=0.52×LG) of 52% of the axial distance LG. Further, it is more preferable that each end edge portion 140ce on the other axial side of each small ridge portion 140 be arranged between an axial position ap2, which is a position on the upstream side in the resin flow direction with respect to the end 122 of the cavity CV on the downstream side in the resin flow direction and away from the end 122 only at a distance L2 (L2=0.43×L121) of 43% of the total length L121 in the axial direction of the cavity surface 121 for one-axial-side portion, and an axial position ap3, which is a position on the upstream side in the resin flow direction with respect to the end 122 of the cavity CV on the downstream side in the resin flow direction and away from the end 122 only at a distance L3 (L3=0.85×L121) of 85% of the total length L121 in the axial direction.

As a result, in a region that is relatively close to the gate G and thus is difficult to form a weld portion W, it is possible to suppress a decrease in strength of the resin member 200 because a large number of small ridge portions 140 are provided, and at the same time, it is possible to improve the strength of the weld portion W because the flow of the weld resin is actively directed in a weld intersecting direction (circumferential direction), as compared with the case where each small ridge portion 140 is arranged in the vicinity of the end portion of the cavity CV on the downstream side in the resin flow direction (one axial side).

The resin member 200 of FIG. 19 is in a similar manner with the above, where each small groove portion 240 is preferably arranged on the downstream side in the resin flow direction (one axial side) of the main body MB and on the upstream side with respect to the end portion of the main body MB on the downstream side in the resin flow direction. More specifically, it is more preferable that each end edge portion 240ce on the other axial side of each small groove portion 240 of the present example be arranged between an axial position ap2', which is a position on the upstream side in the resin flow direction with respect to the end 222 of the main body MB on the downstream side in the resin flow direction and away from the end 222 only at a distance L2' (L2'=0.25×LG') of 25% of the axial distance LG' between the gate G and the one-axial-side end of the main body MB (one-axial-side end surface 222), and an axial position ap3', which is a position on the upstream side in the resin flow direction with respect to the end 222 of the main body MB on the downstream side in the resin flow direction and away from the end 222 only at a distance L3' (L3'=0.52×LG') of 52% of the axial distance LG'. Further, it is more preferable that each end edge portion 240ce on the other axial side of each small groove portion 240 of the present example be arranged between an axial position ap2', which is a position on the upstream side in the resin flow direction with respect to the end 222 of the main body MB on the downstream side in the resin flow direction and away from the end 222 only at a distance L2' (L2'=0.43×L221) of 43% of the total length L221 in the axial direction of the one-axial-side portion 221, and an axial position ap3', which is a position on the upstream side in the resin flow direction with respect to the end 222 of the main body MB on the downstream side in the resin flow direction and away from the end 222 only at a distance L3' (L3'=0.85×L221) of 85% of the total length L221 in the axial direction.

As illustrated in FIG. 17, in the mold 100 of the present example, the suitable numerical range of the height h140 of the small ridge portion 140, which is measured along the radial direction at a position where the height of the small ridge portion 140 is maximum, is the same as that described in Embodiment 3 with reference to FIG. 12B.

As illustrated in FIG. 20, the resin member 200 of the present example is in a similar manner with the above, where the suitable numerical range of the depth d240 of the small groove portion 240, which is measured along the radial direction at a position where the depth of the small groove portion 240 is maximum, is the same as that described in Embodiment 3 with reference to FIG. 15B.

The mold 100 may have only one small ridge portion row 180 or 181, or three or more small ridge portion rows 180 and 181 on the cavity surface 121 for one-axial-side portion. However, from the viewpoint of guaranteeing the strength of the resin member 200 as a molded article, it is better to only have two or less small ridge portion rows 180 and 181.

The resin member 200 is in a similar manner with the above, where the resin member 200 may have only one small groove portion row 280 or 281, or three or more small groove portion rows 280 and 281 on the outer circumferential surface of the one-axial-side portion 221. However, it is better to only have two or less small groove portion rows 280 and 281.

Embodiment 5

Figure 21A:
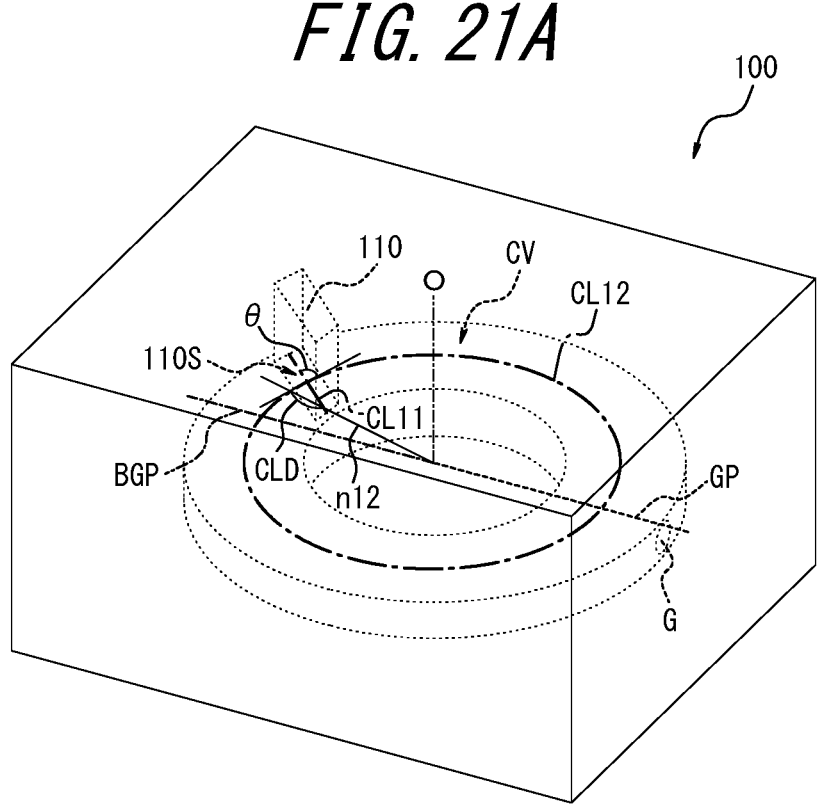
FIG. 21A is a perspective view illustrating the injection mold of Embodiment 5 of the present disclosure.
Figure 21B:
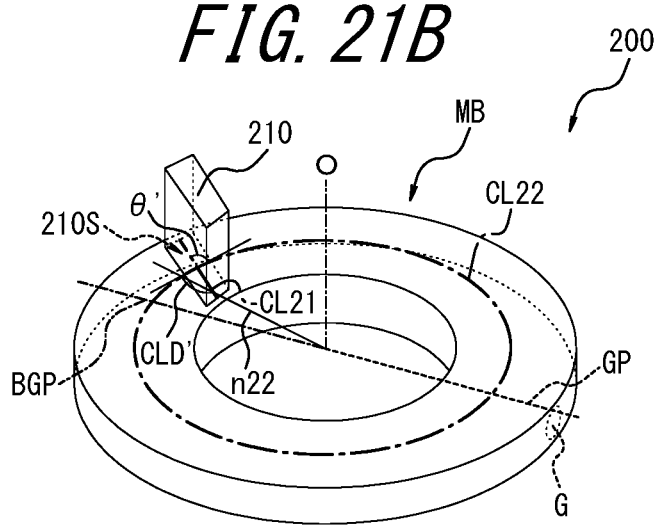
FIG. 21B is a perspective view illustrating the resin member of Embodiment 5 of the present disclosure.

Embodiment 5 of the present disclosure will be described with reference to FIGS. 21A and 21B. FIG. 21A illustrates a mold 100 of the present embodiment. FIG. 21B illustrates a resin member 200 of the present embodiment.

In Embodiment 1, the cavity CV of the mold 100 is formed in a cylindrical shape where the axial length is longer than the outer diameter. However, in Embodiment 5, the cavity CV of the mold 100 is formed in an annular shape (doughnut shape) where the outer diameter is longer than the axial length.

In FIG. 21A, the mold 100 has only one gate G. The position (angular position) corresponding to the gate G is a gate position GP, the position (angular position) that is equidistant from the gate position GP along the cavity CV is a between-gate position BGP, and a weld portion W is formed in the vicinity thereof. The mold 100 is provided with a resin reservoir 110. The resin reservoir 110 is open to a cavity surface of the cavity CV for molding the one-axial-side end surface of a resin member, and extends in the axial direction.

In the first cross section along the opening end surface 110S of the resin reservoir 110 to the cavity CV, the distance CLD between the width center line CL11 of the resin reservoir 110 and the width center line CL12 of the cavity CV, which is measured along the perpendicular line n12 of the width center line CL12 of the cavity CV, is not always constant and changes at least in part along the width center line CL12 of the cavity CV (always changes in the illustrated example). In addition, the width center line CL11 of the resin reservoir 110 in the first cross section along the opening end surface 110S of the resin reservoir 110 to the cavity CV extends in a direction intersecting at a non-right angle with respect to the width center line CL12 of the cavity CV in the first cross section, and intersects at a non-right angle with respect to the width center line CL12. In other words, at the intersection of the width center line CL11 of the resin reservoir 110 and the width center line CL12 of the cavity CV in the first cross section, the smaller intersection angle θ between the tangent of the width center line CL11 of the resin reservoir 110 and the tangent of the width center line CL12 of the cavity CV at the intersection is more than 0° and less than 90°. Note that the preferable range of the intersection angle θ is the same as that described in Embodiment 1.

The opening end surface 110S of the resin reservoir 110 to the cavity CV is at a position (angular position) between the gate position GP and the between-gate position BGP.

According to the present embodiment, the flow of the resin is disturbed in the vicinity of the between-gate position BGP and in the vicinity of the weld portion W, so that the shape of the weld portion W and the orientation of the reinforcing fibers F in the vicinity of the between-gate position BGP and in the vicinity of the weld portion W can be disturbed, as described in Embodiments 1 to 4 above. The strength of the weld portion W thus can be improved.

The resin member 200 in FIG. 21B is obtained by the molding step described in Embodiment 1 using the mold 100 in FIG. 21A. In the resin member 200, there is only one gate position GP, a position (angular position) that is equidistant from the gate position GP along the main body MB is a between-gate position BGP, and a weld portion W is formed in the vicinity thereof. The resin member 200 is provided with a projection 210. The projection 210 is connected to the one-axial-side end surface of the resin member 200 and extends in the axial direction.

In the first cross section along the connecting end surface 210S of the projection 210 to the main body MB, the distance CLD' between the width center line CL21 of the projection 210 and the width center line CL22 of the main body MB, which is measured along the perpendicular line n22 of the width center line CL22 of the main body MB, changes at least in part along the width center line CL22 of the main body MB (always changes in the illustrated example). In addition, the width center line CL21 of the projection 210 in the first cross section along the connecting end surface 210S of the projection 210 to the main body MB extends in a direction intersecting at a non-right angle with respect to the width center line CL22 of the main body MB in the first cross section and intersects at a non-right angle with respect to the width center line CL22. In other words, at the intersection of the width center line CL21 of the projection 210 and the width center line CL22 of the main body MB in the first cross section, the smaller intersection angle θ' between the tangent of the width center line CL21 of the projection 210 and the tangent of the width center line CL22 of the main body MB at the intersection is more than 0° and less than 90°. Note that the preferable range of the intersection angle θ' is the same as that described in Embodiment 1.

The connecting end surface 210S of the projection 210 to the main body MB is at a position (angular position) between the gate position GP and the between-gate position BGP.

Embodiment 6

Figure 22A:
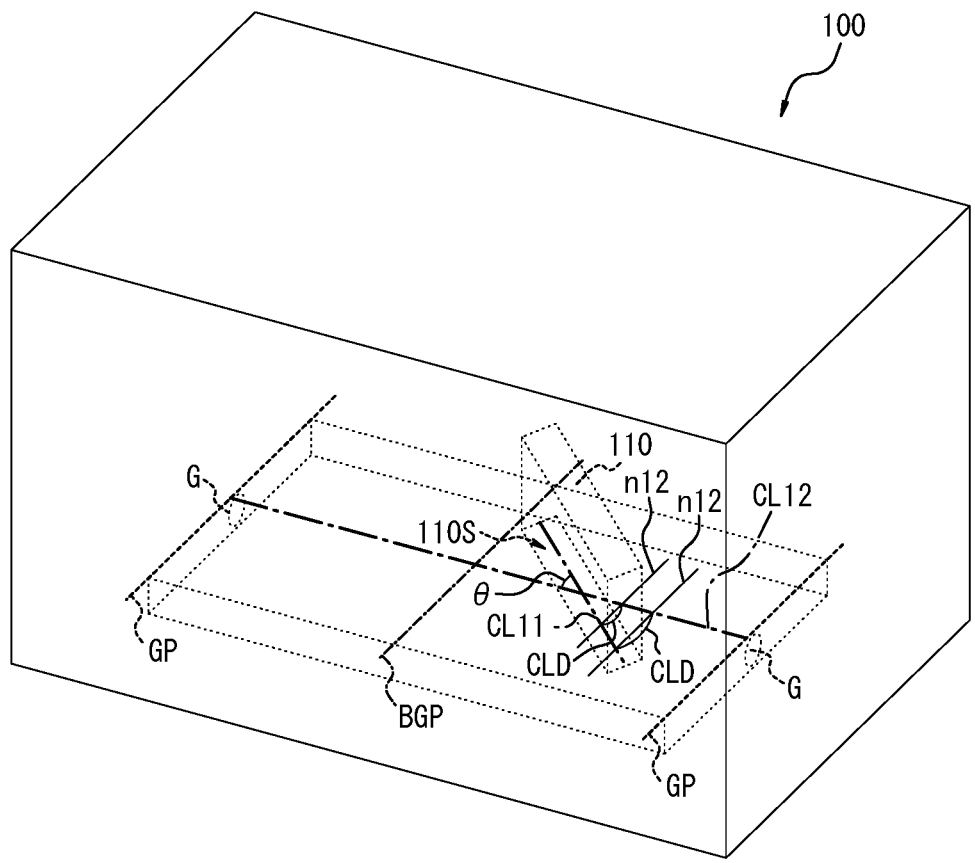
FIG. 22A is a perspective view illustrating the injection mold of Embodiment 6 of the present disclosure.
Figure 22B:
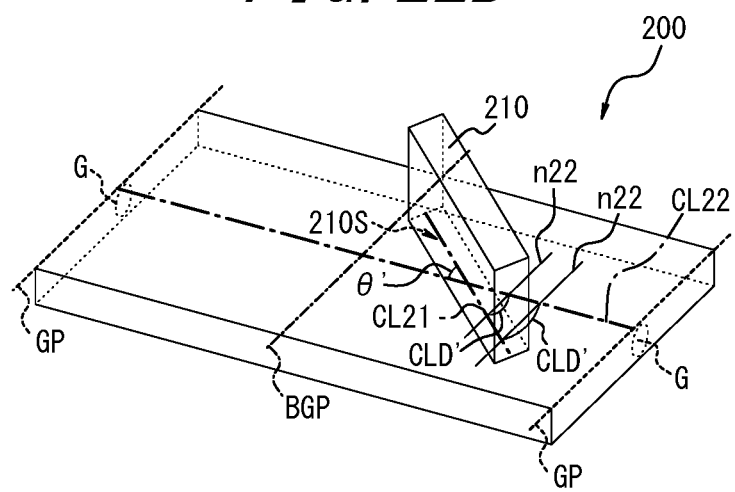
FIG. 22B is a perspective view illustrating the resin member of Embodiment 6 of the present disclosure.

Embodiment 6 of the present disclosure will be described with reference to FIGS. 22A and 22B. FIG. 22A illustrates a mold 100 of the present embodiment. FIG. 22B illustrates a resin member 200 of the present embodiment.

In Embodiment 6 the cavity CV of the mold 100 is formed in a flat plate shape, where the shape is a rectangle whose length in one direction is longer than the length in the direction perpendicular thereto in a plan view, and the thickness is small.

In FIG. 22A, the mold 100 has one gate G at each of the two end portions in the extending direction (longitudinal direction) of the cavity CV (two in total). The position in the extending direction corresponding to the gate G is a gate position GP, the position (position in the extending direction) that is equidistant from the gate position GP along the cavity CV is a between-gate position BGP, and a weld portion W is formed in the vicinity thereof. The mold 100 is provided with a resin reservoir 110. The resin reservoir 110 is open to a cavity surface of the cavity CV for molding the end surface on one side in the thickness direction of a resin member, and extends in the thickness direction of the cavity CV.

In the first cross section along the opening end surface 110S of the resin reservoir 110 to the cavity CV, the distance CLD between the width center line CL11 of the resin reservoir 110 and the width center line CL12 of the cavity CV, which is measured along the perpendicular line n12 of the width center line CL12 of the cavity CV, is not always constant and changes at least in part along the width center line CL12 of the cavity CV (always changes in the illustrated example). In addition, the width center line CL11 of the resin reservoir 110 in the first cross section along the opening end surface 110S of the resin reservoir 110 to the cavity CV extends in a direction intersecting at a non-right angle with respect to the width center line CL12 of the cavity CV in the first cross section, and intersects at a non-right angle with respect to the width center line CL12. In other words, at the intersection of the width center line CL11 of the resin reservoir 110 and the width center line CL12 of the cavity CV in the first cross section, the smaller intersection angle θ between the tangent of the width center line CL11 of the resin reservoir 110 and the tangent of the width center line CL12 of the cavity CV at the intersection is more than 0° and less than 90°. Note that the preferable range of the intersection angle θ is the same as that described in Embodiment 1.

The opening end surface 110S of the resin reservoir 110 to the cavity CV is at a position (position in the extending direction) between the gate position GP and the between-gate position BGP.

According to the present embodiment, the flow of the resin is disturbed in the vicinity of the between-gate position BGP and in the vicinity of the weld portion W, so that the shape of the weld portion W and the orientation of the reinforcing fibers F in the vicinity of the between-gate position BGP and in the vicinity of the weld portion W can be disturbed, as described in Embodiments 1 to 5 above. The strength of the weld portion W thus can be improved.

The resin member 200 in FIG. 22B is obtained by the molding step described in Embodiment 1 using the mold 100 in FIG. 22A. The resin member 200 has one gate position GP at each of the two end portions in the extending direction (longitudinal direction) of the main body MB (two in total). A position (position in the extending direction) that is equidistant from the gate position GP along the main body MB is a between-gate position BGP, and a weld portion W is formed in the vicinity thereof. The resin member 200 is provided with a projection 210. The projection 210 is connected to the end surface on one side in the thickness direction of the resin member 200 and extends in the thickness direction of the main body MB.

In the first cross section along the connecting end surface 210S of the projection 210 to the main body MB, the distance CLD' between the width center line CL21 of the projection 210 and the width center line CL22 of the main body MB, which is measured along the perpendicular line n22 of the width center line CL22 of the main body MB, changes at least in part along the width center line CL22 of the main body MB (always changes in the illustrated example). In addition, the width center line CL21 of the projection 210 in the first cross section along the connecting end surface 210S of the projection 210 to the main body MB extends in a direction intersecting at a non-right angle with respect to the width center line CL22 of the main body MB in the first cross section and intersects at a non-right angle with respect to the width center line CL22. In other words, at the intersection of the width center line CL21 of the projection 210 and the width center line CL22 of the main body MB in the first cross section, the smaller intersection angle θ' between the tangent of the width center line CL21 of the projection 210 and the tangent of the width center line CL22 of the main body MB at the intersection is more than 0° and less than 90°. Note that the preferable range of the intersection angle θ' is the same as that described in Embodiment 1.

The connecting end surface 210S of the projection 210 to the main body MB is at a position (position in the extending direction) between the gate position GP and the between-gate position BGP.

The presently disclosed injection mold, resin member, and method for producing a resin product are not limited to the above-described embodiments, and may be modified in various ways.

For example, the technical elements of any of the above-described embodiments may be combined with other embodiments. For example, for the mold 100, the resin reservoir 110 of Embodiment 1 or Embodiment 2, and at least one arbitrarily selected from the group consisting of the annular ridge portion 130, the small ridge portion 140, the small ridge portion row 182, the small ridge portion row 180, the small ridge portion row 181 and the annular groove portion 170 described in Embodiment 3 or Embodiment 4 may be used in combination. The resin member 200 is in a similar manner with the above, where the projection 210 of Embodiment 1 or Embodiment 2, and at least one arbitrarily selected from the group consisting of the annular groove portion 230, the small groove portion 240, the small groove portion row 282, the small groove portion row 280, the small groove portion row 281 and the annular ridge portion 270 described in Embodiment 3 or Embodiment 4 may be used in combination. Further, the shape of the cavity CV of the mold 100 and the shape of the main body MB of the resin member 200 are not limited to the above-described cylindrical shape, annular shape or flat plate shape, and may be any shape.

INDUSTRIAL APPLICABILITY

The presently disclosed injection mold, resin member, and method for producing a resin product can be used in resin products of all types, applications, and shapes.

REFERENCE SIGNS LIST 100 injection mold
101 to 104 outer mold portion
101a inner mold accommodating portion
105 and 106 inner mold portion
110 resin reservoir
110P tip protrusion
110S opening end surface
120 cavity surface for torque input portion (cavity surface for axial-middle portion)
120a convex portion
121 cavity surface for one-axial-side portion
122 cavity surface for one-axial-side end surface
123 cavity surface for female screw
124 and 125 cavity surface for other-axial-side portion
130 annular ridge portion
131 annular groove portion
140, 150, 151, 160, and 161 small ridge portion (ridge portion)
140a and 140b wall surface of the small ridge portion
140ae, 140be, and 140ce end edge portion of the outer edge of the base end surface of the small ridge portion
170 annular groove portion
180, 181, and 182 small ridge portion row (ridge portion row)
200 resin member
210 projection
210P tip protrusion
210S connecting end surface
211 removal trace
220 torque input portion (axial-middle portion)
220a concave portion
221 one-axial-side portion
222 one-axial-side end surface
223 female screw
224 other-axial-side portion
230 annular groove portion
231 annular ridge portion
240, 250, 251, 260, and 261 small groove portion (groove portion)
240a and 240b wall surface of the small groove portion
240ae, 240be, and 240ce end edge portion of the outer edge of the opening end surface of the small groove portion 270 annular ridge portion
280, 281, and 282 small groove portion row (groove portion row)
300 joint
310 outer cylinder
BGP between-gate position
CL11 width center line of the resin reservoir
CL11c center point of the width center line of the resin reservoir
CL12 width center line of the cavity
CL21 width center line of the projection
CL21c center point of the width center line of the projection
CL22 width center line of the main body
CV cavity
F reinforcing fiber
G gate (or trace of gate)
GP gate position
MB main body
n11 perpendicular line of the width center line of the resin reservoir
n12 perpendicular line of the width center line of the cavity
n21 perpendicular line of the width center line of the projection
n22 perpendicular line of the width center line of the main body
O central axis
R runner
T tool
VP11 and VP21 first virtual plane
W weld portion

The invention claimed is:

1. A resin member comprising a resin containing reinforcing fibers, and having a weld portion, wherein
the resin member has a projection connected to a main body of the resin member,
in a first cross section along a connecting end surface of the projection to the main body, a distance between a width center line of the projection and a width center line of the main body, which is measured along a perpendicular line of the width center line of the main body, changes at least in part along the width center line of the main body, where the width center line of the projection passes through a center of a width direction of the connecting end surface with the width direction of the connecting end surface being perpendicular to an extending direction of the connecting end surface, and the width center line of the main body passes through a center of a width direction of the main body with the width direction of the main body being perpendicular to an extending direction of the main body,
the main body is a cylindrical member,
the projection is connected to an end surface on either of one side or the other side in an axial direction of the cylindrical member,
in the first cross section, the width center line of the projection has a part in which a distance from a central axis of the main body changes along the width center line of the projection, and
an outer edge of the connecting end surface of the projection to the main body is formed in a parallelogram shape with non-perpendicular diagonals.

2. The resin member according to claim 1, wherein, in the first cross section, the width center line of the projection extends in a direction intersecting at a non-right angle with respect to the width center line of the main body.

3. The resin member according to claim 2, wherein, in the first cross section, the width center line of the projection intersects at a non-right angle with respect to the width center line of the main body.

4. The resin member according to claim 1, wherein, in the first cross section, an end portion on one side of the width center line of the projection has a longer distance from the central axis of the main body than an end portion on the other side of the width center line of the projection.

5. The resin member according to claim 1, wherein the main body has a female thread on an inner circumferential surface on either of the one side or the other side in the axial direction of the cylindrical member.

6. The resin member according to claim 5, wherein the projection is connected to an end surface on either of the one side or the other side having the female thread.

* * * * *